(12) United States Patent
Mizutani et al.

(10) Patent No.: US 8,027,258 B2
(45) Date of Patent: Sep. 27, 2011

(54) COMMUNICATION SYSTEM AND COMMUNICATION APPARATUS

(75) Inventors: Masahiko Mizutani, Yokohama (JP); Yusuke Yajima, Fujisawa (JP); Takayuki Kanno, Yokohama (JP); Takeshi Yasuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 12/488,823

(22) Filed: Jun. 22, 2009

(65) Prior Publication Data

US 2010/0002591 A1      Jan. 7, 2010

(30) Foreign Application Priority Data

Jul. 4, 2008    (JP) ................. 2008-175828

(51) Int. Cl.
*H04L 1/00* (2006.01)
*H04L 12/26* (2006.01)

(52) U.S. Cl. .................. 370/236; 370/252
(58) Field of Classification Search .......... None
See application file for complete search history.

(56) References Cited

U.S. PATENT DOCUMENTS

2002/0109876 A1* 8/2002 Eijk et al. .............. 359/110
2008/0310417 A1* 12/2008 Friskney et al. .......... 370/392

OTHER PUBLICATIONS

ITU-T Recommendation G.984.1, "Gigabit-capable Passive Optical Networks (GPON): General characteristics", Mar. 2003.
ITU-T Recommendation G.984.2, "Gigabit-capable Passive Optical Networks (GPON): Physical Media Dependent (PMD) layer specification", Mar. 2003.
ITU-T Recommendation G.984.3, "Gigabit-capable Passive Optical Networks (GPON): Transmission convergence layer specification", Feb. 2004.
IEEE 802.3-2005, "IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications", Mar. 2005.
ITU-T Recommendation Y.1731, "OAM functions and mechanisms for Ethernet (registered trademark) based networks", May 2006.
ITU-T Recommendation G.8031/Y.1342, "Ethernet (registered trademark) Protection Switching", Jun. 2006.

* cited by examiner

*Primary Examiner* — Ricky Ngo
*Assistant Examiner* — Clemence Han
(74) *Attorney, Agent, or Firm* — Antonelli, Terry, Stout & Kraus, LLP.

(57) ABSTRACT

Communication time period measuring frames are simultaneously sent from an OAM adaptive device on a transmission side, to both a working path and a protection path. In an OAM adaptive device on a reception side, reception times of the frames having arrived from both the paths are checked so as to measure a time period difference between both the paths. The time period difference is fed back to a logic distance adjustment function of each PON section to determine required communication time periods of the PON sections respectively included in a working system and a protection system. Communication time periods of the working system and the protection system in a packet communication network are arbitrated in order to decrease a packet loss at line switching in a packet relaying network.

11 Claims, 16 Drawing Sheets

EqD INFORMATION (A)

| ONU ID | EqD |
|---|---|
| ONU1 | EqD1 |
| ONU2 | EqD2 |

(B)

| PATH ID | EqD |
|---|---|
| 1 | EqD1 |
| 2 | EqD2 |

G. 7: ACQUIRED FROM PATH INFORMATION 1294

(C)

| ONU ID | PATH ID | EqD |
|---|---|---|
| ONU1 | 1 | EqD1 |
| ONU2 | 2 | EqD2 |

FIG.5

DELAY DB

FIG.11A
ACQUIRED FROM PATH INFORMATION 1294

| PATH ID 1610 | TRANSMISSION TIMING ID 1620 | WORKING COMMUNICATION TIME PERIOD 1630 | PROTECTION COMMUNICATION TIME PERIOD 1640 | ARRIVAL TIME DIFFERENCE 1650 |
|---|---|---|---|---|
| 1 | Time1_1 | T1_w | T1_p | -dt1 |
| 2 | Time2_1 | T2_w | T2_p | dt2 |

FIG.11B

| PATH ID 1610 | TRANSMISSION TIMING ID 1620 | WORKING COMMUNICATION TIME PERIOD 1630 | PROTECTION COMMUNICATION TIME PERIOD 1640 | ARRIVAL TIME DIFFERENCE 1650 |
|---|---|---|---|---|
| 1 | Time1_2 | T1_p (= T1_w +dt1) | T1_p | 0 |
| 2 | Time2_2 | T2_w | T1_p (=T2_w + dt2) | 0 |

COMMUNICATION SYSTEM AND COMMUNICATION APPARATUS

CLAIM OF PRIORITY

The present application claims priority from Japanese patent application JP 2008-175828 filed on Jul. 4, 2008, the content of which is hereby incorporated by reference into this application.

BACKGROUND OF THE INVENTION

1. Field of the Invention

The present invention relates to a communication system and a communication apparatus, and more particularly to a communication system and a communication apparatus for adjusting or arbitrating the communication time periods of a working communication path and a protection communication path.

2. Description of the Related Art

In general, with increase in a demand for a broad band, the introduction of a large-capacity access line employing an optical fiber has advanced as a user-oriented access line, instead of communication technology which is based on a telephone line such as digital subscriber line (DSL). At present, a passive optical network (PON) system in which the optical fiber can be shared by a plurality of subscribers is often utilized as the optical access line from the viewpoints of a line laying cost and a maintenance management cost. The PON system which can manage connection situations and bandwidth utilization situations concentrically on the side of a station building, by multiplexing traffics that flow between the plurality of users and the station building, is one of major techniques in a subscriber line service in the future.

In "ITU-T" (International Telecommunication Union Telecommunication Standard Sector) which is one of international standardization organizations, a "G-PON" (Gigabit capable PON) system has been stipulated (Non-patent Documents 1 to 3). In 2006, many vendors started providing GPON products into markets, and common carriers in individual countries simultaneously started optical access services based on the adoption of the GPON. Besides, some common carriers are providing optical access services by employing "GE-PON" (Gigabit "Ethernet" (registered trademark) PON) (Non-patent Document 4) which has been stipulated by "IEEE" (Institute of Electrical and Electronics Engineers, Inc.) being another international standardization organization.

In transmission networks, shifts to packet communication techniques such as "Ethernet" (registered trademark) and "MPLS" (Multi Protocol Label Switching) have been studied instead of an existing "SONET" (Synchronous Optical NETwork)/"SDH" (Synchronous Digital Hierarchy) technique, and an existing "ATM" (Asynchronous Transfer Mode) technique. In the packet communication network, a packet format consisting of a header and a payload is configured, and a relaying device processes each packet on the basis of a destination ID and a transmission source ID which are contained in the header part, relevant path control information items, etc. A communication aspect on this occasion is not a scheme in which signals are transmitted and received by employing statically set paths as in the existing synchronous network or ATM network, but a communication scheme in which respective packets undergo different communication paths. When note is taken of part of the path, a series of packets having the same header information do not occupy the path, but a plurality of packets having header information items different from one another exist on the path at the same time.

At present, the communication network is becoming an indispensable existence as a social infrastructure. The lowering of the prices of communication services has been required together with the spread of the communication network. In this flow, it is thought substantially obvious to lead to the idea that the infrastructure is configured in a form in which the optical access network and the packet communication network is combined. On the other hand, a high stability is required for providing the infrastructure. However, the development of a maintenance management function for enhancing a stability forms a factor for a cost expansion.

As one method for coping with the contradictory requirements of realizing the lowering of the price and ensuring the high stability, there has been studied a method in which, for the pseudo maintenance management of paths in the packet communication, "VLAN" (Virtual Local Area Network) in "Ethernet" (registered trademark) and "LSP" (Label Switch Path) in the MPLS are set, whereupon their continuity is managed. The idea that the path is set on the packet communication network in pseudo fashion and that the path is maintenance-managed, is a useful idea in the coexistence of the packet communication network with the existing network and the shift thereof from the existing network. As a typical example, an Ether "OAM" (Operation, Administration and Maintenance) technique is mentioned (Non-patent Document 5). Further, a protection switching technique based on the Ether OAM (Non-patent Document 6) has been standardized.

[Non-Patent Document 1] ITU-T Recommendation G.984.1, "Gigabit-capable Passive Optical Networks (GPON): General characteristics"

[Non-Patent Document 2] ITU-T Recommendation G.984.2, "Gigabit-capable Passive Optical Networks (GPON): Physical Media Dependent (PMD) layer specification"

[Non-Patent Document 3] ITU-T Recommendation G.984.3, "Gigabit-capable Passive Optical Networks (GPON): Transmission convergence layer specification"

[Non-Patent Document 4] IEEE 802.3-2005, "IEEE Standard for Information technology-Telecommunications and information exchange between systems-Local and metropolitan area networks—Specific requirements Part 3: Carrier Sense Multiple Access with Collision Detection (CSMA/CD) Access Method and Physical Layer Specifications"

[Non-Patent Document 5] ITU-T Recommendation Y.1731, "OAM functions and mechanisms for Ethernet (registered trademark) based networks"

[Non-Patent Document 6] ITU-T Recommendation G.8031/Y.1342, "Ethernet (registered trademark) Protection Switching"

SUMMARY OF THE INVENTION

At the present stage, it is said that the packet communication network can freely alter a network configuration owing to the autonomous operations of devices, whereas it is inferior to the synchronous communication network in point of the stability of the path. The communication network as the social infrastructure needs to flexibly cope with a failure immunity. On the other hand, however, it is required that a common can set a path for the maintenance management, and that the stability (continuity) of an operation till the moment of a failure is kept. It can be said that these are usually requirements contradictory to each other.

In the conventional synchronous communication network, information items flowing on a path are telephonic vocal data and Web data of small data size, and a traffic flowing through the whole network has been small. Besides, if the vocal data can complete switching in a short time (for example, about 50 ms), a user does not recognize the path failure.

At present, the proportion of image data becomes high relative to that of voice, and the user can recognize the disorder of reception information in real time, in correlation with the development of an image enhancement. Besides, data quantities which are downloaded from the Web, etc. have enlarged, and line bandwidths have widened, so that the failures of some packet transmissions can similarly be sensually recognized as the extension of a transmission time period by the user.

In switching the communication path from a working system to a protection system in the packet communication network, a fixed time period is required for analyzing a maintenance management packet (OAM packet) for checking a path situation. In a case where any communication failure has occurred in the path being used, the path temporarily becomes a nonexistent situation during a time period required for the control packet analysis and the path switching process, with the result that some packets might be discarded.

Besides, in performing protection switching in an access-section redundantization configuration which includes the PON in a transmission line, the data transfer time periods of maintenance monitoring sections need to be equal in both a working path and a protection path. In addition, since bandwidths required for the respective paths which are used before and after the path switching are different, a bandwidth control interlocked with the switching is required.

In such considerations, it is required to arbitrate the communication performances of the working system and the protection system in the packet communication network, to perform the bandwidth control at the path switching, and to inhibit packet discarding at the path failure.

In view of the above point, an object of the present invention is to arbitrate the communication time periods of a working system and a protection system in a packet communication network for the purpose of decreasing a packet loss at line switching in a packet relaying network. Another object of the invention is to occasionally perform a communication time adjustment when the communication time period has changed due to a failure or the like on the packet communication network.

In a network system configured of a subscriber accommodation system which connects a user and a common carrier device by an access line employing an optical fiber, and a packet communication network which is connected as a host to the subscriber accommodation system and which connects a plurality of subscriber accommodation systems, the present invention relates a communication-network maintenance management technique and a communication-path switching technique for providing to a user, a redundant communication network which includes a working communication path that is used for ordinary communications, and a protection communication path that is used at any communication failure; and, for enhancing the availability of a communication channel by switching either communication path to the other path when the communication failure has occurred.

According to the first solving means of the present invention, there is provided a communication system comprising:

one subscriber accommodation network which includes a first subscriber accommodation device capable of connecting one or more subscriber devices in a time division multiplexing scheme, and a second subscriber accommodation device capable of connecting one or more other subscriber devices in the time division multiplexing scheme, or a plurality of subscriber accommodation networks which include the first or second subscriber accommodation devices individually;

a first communication network which includes a plurality of subscriber devices, and a first communication device connectable with the plurality of subscriber devices; and a second communication network which includes the first and second subscriber accommodation devices, and a second communication device that is capable of connecting the first and second subscriber accommodation devices and that has a function of selecting either of the subscriber devices to-be-utilized, in which the first communication device and the second communication device are connected by a plurality of communication paths through the first communication network, the one or the plurality of subscriber accommodation networks, and the second communication network, wherein, in adjusting a required time period of information delivery between the first communication device and the second communication device, the first communication device which serves as a transmission side sends communication time period measuring frames for measuring the required delivery time periods, to the plurality of communication paths, to the first and second subscriber devices, the first and second subscriber devices receive the communication time period measuring frames, and transmit first and second delay measurement frames based on the communication time period measuring frames, respectively, to the first and second subscriber accommodation devices, the first and second subscriber accommodation devices receive the first and second delay measurement frames, and transfer the first and second delay measurement frames to the second communication device, respectively, the second communication device which serves as a reception side for the plurality of communication paths receives the first and second delay measurement frames, and records the first and second required delivery time periods through the plurality of communication paths, in a delay database, respectively, the second communication device calculates correction magnitudes of the required delivery time periods in the plurality of communication paths, with reference to the first and second required delivery time periods, the second communication device notifies the correction magnitudes to the first or second subscriber accommodation device which has a function of controlling the required delivery time period in the subscriber accommodation network, and the first or second subscriber accommodation device indicates delay information denoting a wait time period for adjusting the required delivery time period, to at least one of the plurality of subordinate subscriber devices, in accordance with the correction magnitude, and the subscriber device adjusts transfer timings in accordance with the delay information, by a function of controlling the required delivery time periods provided by the subscriber devices, so that the required delivery time periods between the first communication device and the second communication device are adjusted so as to equalize in the plurality of communication paths which connect the first communication device and the second communication device.

According to the second solving means of the present invention, there is provided a communication system comprising:

one subscriber accommodation network which includes a first subscriber accommodation device capable of connecting one or more subscriber devices in a time division multiplexing scheme, and a second subscriber accommodation device capable of connecting one or more other subscriber devices in the time division multiplexing scheme, or a plurality of subscriber accommodation networks which include the first or second subscriber accommodation devices individually;

a first communication network which includes a plurality of subscriber devices, and a first communication device connectable with the plurality of subscriber devices; and a second communication network which includes the first and second subscriber accommodation devices, and a second communication device that is capable of connecting the first and second subscriber accommodation devices and that has a function of selecting either of the subscriber devices to-be-utilized, in which the first communication device and the second communication device are connected by a plurality of communication paths through the first communication network, the one or the plurality of subscriber accommodation networks, and the second communication network, wherein, when both paths of a working system and a protection system have been established, the first communication device simultaneously forwards communication time period measuring frames which includes path identification information and sending timing identification information, to both the paths;

the first subscriber device which has received the communication time period measuring frame sends a first delay measurement frame to an uplink communication path, in accordance with an assignment of a bandwidth by the first subscriber accommodation device;

the second subscriber device which has received the communication time period measuring frame sends a second delay measurement frame to an uplink communication path, in accordance with an assignment of a bandwidth by the second subscriber accommodation device;

the first subscriber accommodation device which has received the first delay measurement frame from the first subscriber device converts the first delay measurement frame from a format for transferring this frame by the subscriber accommodation network, into a packet format for transferring this frame by the second communication network toward the second communication device, and the first subscriber accommodation device transfers the resulting first delay measurement frame to the second communication device;

the second subscriber accommodation device which has received the second delay measurement frame from the second subscriber device converts the second delay measurement frame from a format for transferring this frame by the subscriber accommodation network, into a packet format for transferring this frame by the second communication network toward the second communication device, and the second subscriber accommodation device transfers the resulting second delay measurement frame to the second communication device;

the second communication device receives the first delay measurement frame from the first subscriber accommodation device, and records a reception time in a delay database, in association with path identification information and transmission timing identification information which are contained in the first delay measurement frame, while the second communication device receives the second delay measurement frame from the second subscriber accommodation device, and records a reception time in the delay database, in association with path identification information and transmission timing identification information which are contained in the second delay measurement frame;

the second communication device calculates an arrival time difference between the delay measurement frames from both the paths, on the basis of the reception times of the delay measurement frames having the same transmission timing identification information from both the paths, and records the arrival time difference in the delay database, in association with the path identification information and the transmission timing identification information; and when the delay measurement frames having the same transmission timing identification information have already been received from a plurality of paths, with reference to the delay database, the second communication device compares the reception times of the delay measurement frames from both the paths, and transmits a delay feedback frame for a revision request containing a correction magnitude based on the arrival time difference, to the first subscriber accommodation device or the second subscriber accommodation device on a side of earlier reception time.

According to the third solving means of the present invention, there is provided a communication apparatus in a communication system, the communication system comprising:

one subscriber accommodation network which includes a first subscriber accommodation device capable of connecting one or more subscriber devices in a time division multiplexing scheme, and a second subscriber accommodation device capable of connecting one or more other subscriber devices in the time division multiplexing scheme, or a plurality of subscriber accommodation networks which include the first or second subscriber accommodation devices individually;

a first communication network which includes a plurality of subscriber devices, and a first communication device connectable with the plurality of subscriber devices; and a second communication network which includes the first and second subscriber accommodation devices, and a second communication device that is capable of connecting the first and second subscriber accommodation devices and that has a function of selecting either of the subscriber devices to-be-utilized, in which the first communication device and the second communication device are connected by a plurality of communication paths through the first communication network, the one or the plurality of subscriber accommodation networks, and the second communication network, wherein, by the communication apparatus, a first delay measurement frame which contains path identification information and sending timing identification information which has been transmitted from another communication device is received from a path which passes through the first subscriber device and the first subscriber accommodation device (or the second subscriber accommodation device), and a reception time thereof is recorded in a delay database, in association with path identification information and transmission timing identification information which are contained in the first delay measurement frame;

a second delay measurement frame which contains path identification information and sending timing identification information which has been transmitted simultaneously with the first delay measurement frame from the other communication device is received from a path which passes through the second subscriber device and the second subscriber accommodation device, and a reception time thereof is recorded in the delay database, in association with path identification information and transmission timing identification informa tion which are contained in the second delay measurement frame;

an arrival time difference between the delay measurement frames from both the paths is calculated on the basis of the reception times of the delay measurement frames having the same transmission timing identification information items, from both the paths, and the arrival time difference is recorded in the delay database, in association with the path identification information and the transmission timing identification information; and when the delay measurement frames having the same transmission timing identification information items have already been received from a plurality of paths, with reference to the delay database, the reception times of the delay measurement frames from both the paths are compared, and a delay feedback frame for a revision request which contains a correction magnitude based on an arrival time difference is transmitted to the first subscriber accommodation device or the second subscriber accommodation device on a side of earlier reception time.

According to the present invention, the communication time periods of a working system and a protection system in a packet communication network can be arbitrated in order to decrease a packet loss at path switching in a packet relaying network. Moreover, according to the invention, the adjustments of communication time periods can be occasionally performed when they have changed due to a failure or the like on a packet communication network.

BRIEF DESCRIPTION OF THE DRAWINGS

FIG. 5 is a diagram showing configurational examples of an EqD information database which is retained in an OLT 210-W

FIGS. 11A and 11B are diagrams of configurational examples of the delay database of the OAM adaptive NE 200;

DETAILED DESCRIPTION OF THE INVENTION

1. General Description

Figure 1:
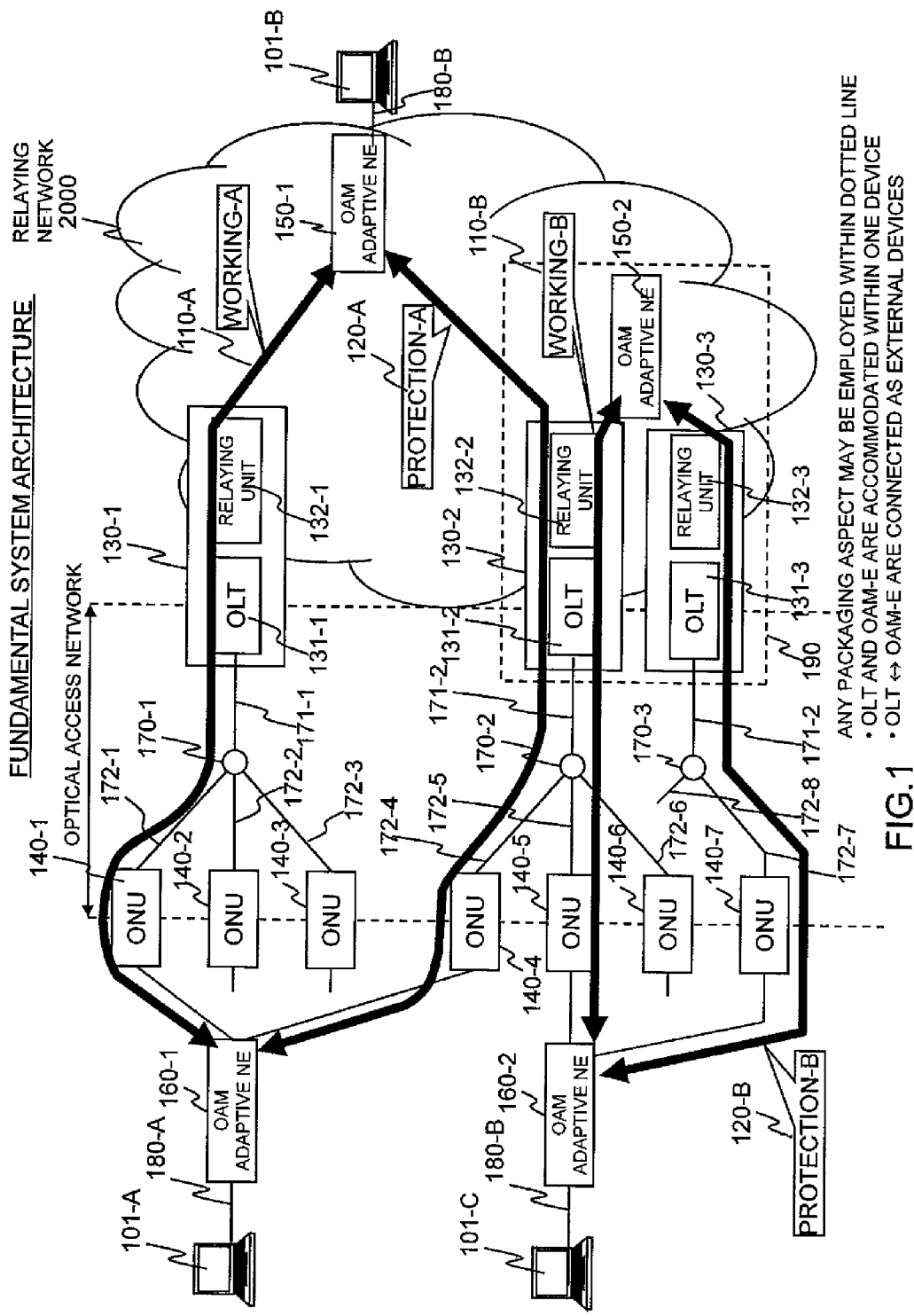
FIG. 1 is a fundamental communication system architecture diagram at the time when an optical access network is included in a protection section.

As stated in the problems to be solved by the invention, time periods required for packet transfers in a working path and a protection path should desirably be equal, for the purpose of preventing the loss of data which is transmitted or received before and after line switching or any influence on an application utilized by a user.

In this regard, by way of example, let's consider a redundant system which employs an optical access (PON) device as part of a packet relaying network. In a case where required communication time periods are different as to both the paths of a working system and a protection system, the required communication time periods between redundantized access lines can be adjusted so as to equalize in both the paths, by utilizing the logical distance adjustment function (ranging function) of the PON. In actuality, it is usual in the packet communication network that, when a path is different, the number of relaying nodes which are passed to a destination is different. The difference of the communication time periods can be absorbed by performing the access network redundantization into which the PON has been introduced.

A plurality of configurational methods are considered in order to redundantize a network by combining the optical access network PON and an Ether OAM device. Typical examples are a method (stated in Non-patent Document 1) in which an optical fiber constituting a PON section is redundantized to prepare for any failure, and an optical-access-network redundantization configuration in which a plurality of PON systems are respectively employed for the working system and the protection system. When a trunk fiber (the optical fiber which is connected to the side of an OLT and through which multiplexed data are passed) is cut off, all the communications of a PON section become impossible for a plurality of subscribers. Therefore, the network redundantization configuration of the latter is a more reliable method in order to ensure the service continuity of a carrier.

As concrete means, communication time period measurement frames are simultaneously sent from an OAM adaptive device of transmission side to both the paths of the working system and the protection system, and the reception times of the frames having arrived from both the paths are checked in an OAM adaptive device of reception side, so as to measure the time difference between both the paths. The time difference is fed back to the logical distance adjustment function of the PON sections, and the required communication time periods of the PON sections respectively included in the working system and the protection system are determined.

By the way, in the OAM adaptive device of the reception side, whether or not receptions are normal may well be decided with reference to the reception times and frame information items of the frames from both the paths, so as to check the communication states of the respective paths and to monitor the transfer performances of the respective paths in real time.

The PON is applied to parts of the respective communication paths of the working system and the protection system, whereby the ranging function of the PON sections can be utilized. Owing to the communication function of the PON, a process for absorbing the communication time period difference between the paths is facilitated. The communication time periods of both the paths are adjusted so as to become equal, whereby at path switching from the working system to the protection system or vise versa, the arrival time of a user data frame from the transmission-side OAM adaptive device to the reception-side OAM adaptive device does not fluctuate, and influence on a user at the line switching (that is, a communication cutoff time period) can be decreased.

A case where the PON is included in only one path, is also applicable when the communication time period in the path including the PON section is shorter than in the other path.

In an embodiment, the case where the PON is included in both the paths will be supposed below by way of example.

2. Fundamental System Architecture

FIG. 1 shows a fundamental communication system architecture diagram at the time when an optical access network is included in a protection section.

Two sets of communication paths, each set being configured of a working path (Working) and a protection path (Protection), are expressed in FIG. 1. The set of a path Working-A (110-A) and a path Protection-A (120-A) is a communication path which is configured of an optical access network and a packet communication network (relaying network) 2000 (hereinafter, collectively stated as the "communication path A"), while the set of a path Working-B (110-B) and a path Protection-B (120-B) is a communication path which includes an optical access network as a principal protection section (hereinafter, collectively stated as the communication path B").

The system includes transmission devices 130-1 to 130-3 which are installed in the subscriber accommodation office of a common carrier (collectively stated as the "OLT (Optical Line Terminal) 130"), ONUs (Optical Network Units) 140-1 to 140-7 which are installed in user sites such as homes and enterprise sites (collectively stated as the "ONU 140", OAM adaptive NEs 150-1, 160-1 and 160-2 which are devices that perform maintenance managements as to sections including the above constituents, and user terminals 101-A to 101-C which are connected to the OAM adaptive NEs. Communication paths 180-A to 180-C from the OAM adaptive NEs to the user terminals may be either LANs in the homes or enterprises, or networks which are connected to Web servers possessed by providers. Whether the connection aspects of the communication paths 180-A to 180-C are radio or wired, and the differences of the sizes of network scales, etc. are not directly pertinent to the essence of the present invention. Therefore, the features of the individual networks are out of the question.

OLTs 131-1 to 131-3 include PON interfaces (not shown), respectively, and the plurality of ONUs 140 can be connected under each of these OLTs. Optical fibers are used for the connections with the ONUs 140. The OLT 131-1 is connected to a power splitter 170-1 through the optical fiber 171-1. The plurality of optical fibers 172-1 to 172-3 are further connected to the power splitter 170-1, and the respective optical fibers are connected to the ONUs 140-1 to 140-3. Hereinbelow, the optical fiber 171-1 located on the side of the OLT 131-1 with respect to the power splitter 170-1 shall be termed the "trunk fiber", and the optical fibers 172-1 to 172-3 located on the side of the ONUs 140 shall be termed the "branch fibers". Likewise, the ONUs 140-4 to 140-6 are connected to the OLT 131-2 through a power splitter 170-2, and the ONU 140-7 is connected to the OLT 131-3 through a power splitter 170-3. In a case where the subordinate ONUs 140-1 to 140-7 have been connected, the individual OLTs 131-1 to 131-3 start up the ONUs 140, and they perform an uplink bandwidth control based on Dynamic Bandwidth Assignment (DBA) and an ONU state management employing ONU Management and Control Interface (OMCI), during communications.

The communications between the OLTs 131-1 to 131-3 and the ONU 140 are performed with optical signals. The signal directed from the OLT 130 toward the ONU 140 (hereinafter, termed the "downlink signal") is branched by the power splitters 170-1 to 170-3, and the resulting signals reach the ONU 140. In the ONU 140, a frame destined for the unit of its own is received, and any other frame is discarded. On the other hand, the signal directed from the ONU 140 to the OLT 130 (hereinafter, termed the "uplink signal") is transmitted from the corresponding one of the individual ONUs 140-1 to 140-7 at a timing which complies with a transmission command given from the OLT 130 to the ONU 140 by the DBA. Such uplink signals are scheduled beforehand by the DBA function of the OLT 130 so that the signals from the ONU 140 may not overlap on trunk fibers 171-1 to 171-3 (in other words, so that the signals may be communicable in time division multiplexing).

The communication path A is set in a section which is held between the OAM adaptive NE 150-1 and the OAM adaptive NE 160-1. The OAM adaptive NE 150-1 is a device which is installed at the edge of the relaying network 2000 which is a packet communication network, and in which the user terminal 101-B is accommodated. The OAM adaptive NE 150-1 is connected with relaying units 132-1 and 132-2 which are respectively installed at the opposing edges of the relaying network 2000. The relaying units 132-1 and 132-2 have the role of interfaces which connect PON sections and the packet communication network. In many cases, the OLT 131-1 or 131-2 and the relaying unit 132-1 or 132-2 are packaged in the aspect of a single device which is integrated in a single casing or on a single board. The packaging aspect is not specified here, but there is considered, for example, an aspect where the relaying unit 132-1 is a large-capacity switch which includes a plurality of ports and under which a plurality of OLTs 130 are connectable.

The other OAM adaptive NE 160-1 is connected with the ONUs 140-1 and 140-4. In FIG. 1, the ONUs 140-1 and 140-4 are supposed to have the fundamental conversion functions between PON ports and electric signals. It is also possible, however, that the ONUs 140-1 and 140-4 have switch functions for packet communications, likewise to the relaying units 132-1 and 132-2 on the side of the OLT 130.

The communication path A uses the Working-A path 110-A for ordinary communications, and in a case where any failure has occurred in the Working-A path (110-A), it is switched to the Protection-A path 120-A so as to continue the communications. Likewise, the communication path B uses the Working-B path 110-B for ordinary communications, and in a case where any failure has occurred in the Working-B path (110-B), it is switched to the Protection-B path 120-B so as to continue the communications.

By the way, in the present invention, an application to a 1:1 protection scheme will be supposed and described. However, the invention is also applicable to a 1+1 protection scheme.

Besides, both the communication paths A and B are capable of one-way protection and two-way protection. In case of, for example, the communication path A, the one-way protection is a method in which path states are diagnosed in a direction from the OAM adaptive NE 150-1 toward the OAM adaptive NE 160-1 and in the reverse direction thereof, separately from each other, so as to perform the path switching. When any abnormality has occurred only in a one-way communication, there can arise a case where separate paths are used in the respective directions (by way of example, the Working-A path (110-A) is used for the communication from the OAM adaptive NE 150-1 toward the OAM adaptive NE 160-1, and the Protection-A path (120-A) is used for the reverse direction communication). The difference of whether the applied communication aspect is one-way or two-way is not pertinent to the essence of the invention.

Further, FIG. 1 exemplifies a situation where the OLTs 131-1 to 131-3 and the relaying units 132-1 to 132-3 are respectively unified into the devices 130-1 to 130-3. This configuration shall be supposed and described also in the ensuing embodiments, but a device configuration on the side of a station building does not influence the essence of the invention. It is also possible to adopt, for example, an aspect where the OLTs 131-1 to 131-3 accommodate the functions of the relaying units 132-1 to 132-3, or a configuration in which the OLTs 131-2 and 131-3, the relaying units 132-2 and 132-3, and the OAM adaptive NE 150-2 are unified in a single casing or on the single interface board of the communication apparatus. In the unified configuration as in the latter, by way of example, the OLTs 131-2 and 131-3 and the relaying units 132-2 and 132-3 are inserted into the slots of a device 190 for the interface board.

Figure 2:
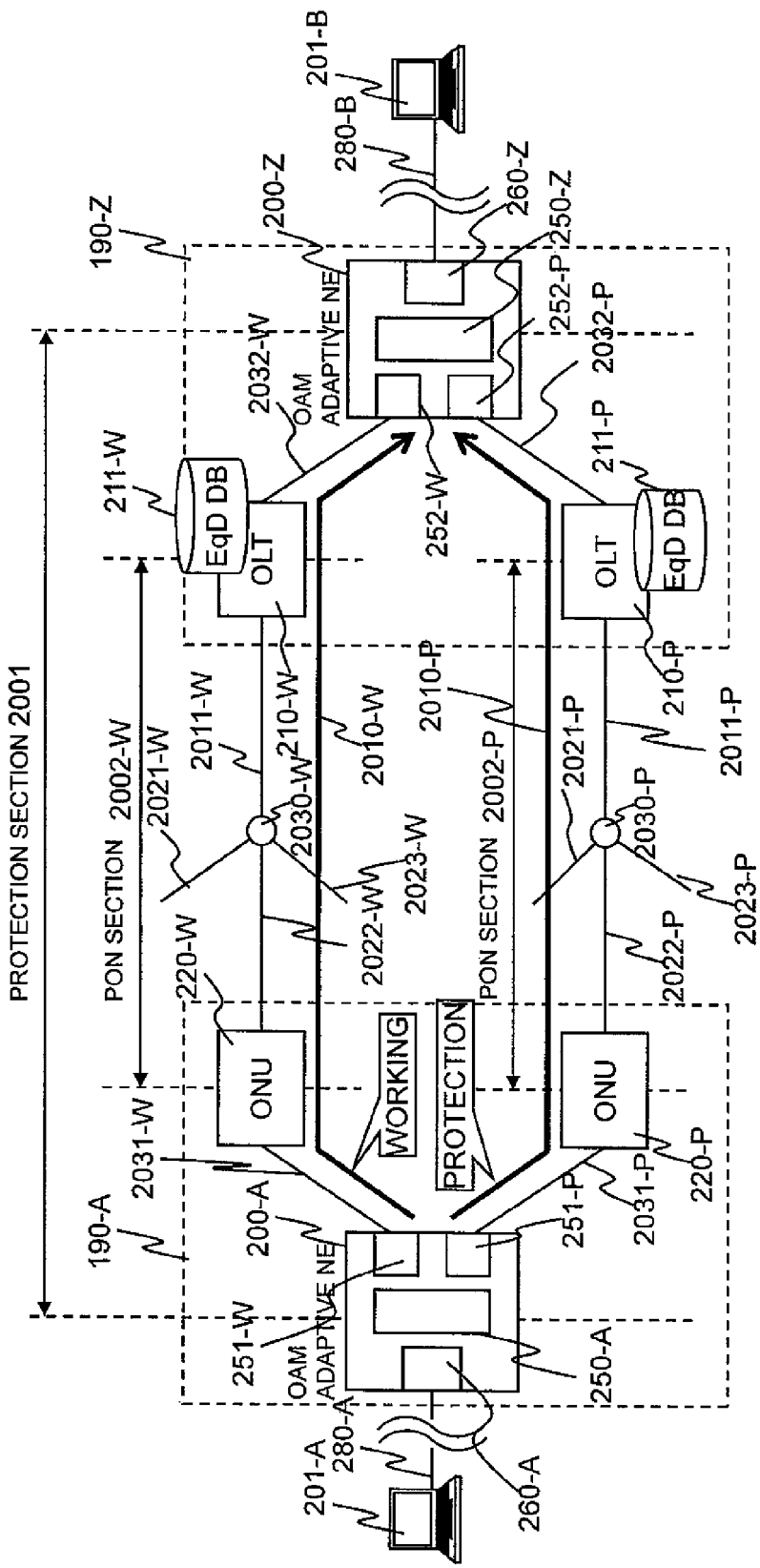
FIG. 2 is a fundamental architectural diagram of a communication system in an embodiment.

FIG. 2 shows a fundamental architectural diagram of a communication system in an embodiment.

The figure is a diagram schematically showing the communication path A in FIG. 1. In order to indicate a practicable example, a G-PON (in any of Non-patent Documents 1 to 3) is supposed as a PON system. Also in case of adopting GE-PON (in Non-patent Document 4), however, similar functions are required, and hence, the contents of the present invention are not affected.

FIG. 2 shows a situation where a working path (working) 2010-W and a protection path (protection) 2010-P are set for an OAM adaptive NE 200-A being the transmission side node of a protection section 2001 and an OAM adaptive NE 200-Z being the reception side node thereof. As shown in FIG. 2, a path 2032-W which connects an OLT 210-W and the OAM adaptive NE 200-Z is supposed to be directly coupled or to be configured of a plurality of packet relaying devices. Likewise, a path 2032-P is configured of a plurality of packet relaying devices. The numbers of the packet relaying devices which constitute the paths 2032-W and 2032-P do not always become the same.

The OAM adaptive NE 200-A includes a UNI side interface 260-A, a protection switch control portion 250-A, an interface 251-W with the working path, and an interface 251-P with the protection path. The functional block configuration of the OAM adaptive NE 200-Z is equivalent to that of the OAM adaptive NE 200-A.

A PON section 2002-W is introduced into the path 2010-W which connects the working interface 251-W and an working interface 252-W. The PON 2002-W connects the OLT 210-W and an ONU 220-W by optical fibers. The trunk fiber 2011-W on the side of the OLT 210-W and the plurality of branch fibers 2021-W to 2023-W on the side of the ONU 220-W are connected through a power splitter 2030-W. In addition to the PON section 2002-W, a line 2031-W which connects the OAM adaptive NE 200-A and the ONU 220-W, and the line 2032-W which connects the OLT 210-W and the OAM adaptive NE 200-Z are included in the working path 2010-W.

The OLT 210-W measures a distance to the ONU 220-W (the response delay time period of the ONU 220-W) in the course of starting up the ONU 220-W (ranging process). The ranging process is a process which is required for an uplink signal from the ONU 220-W toward the OLT 210-W to be identified on the OLT side by the time multiplexing scheme. More specifically, a wait time (hereinbelow, termed the "response time period") in which each individual ONU 220-W receives a transmission command from the OLT 210-W and makes a response is set, and the process prepares for unifying a reference time (reception timing) at which the OLT 210-W receives the uplink signals from all the ONUs 220-W, as to one PON system (a group of ONUs managed by one OLT). The OLT 210-W notifies relative times from the reference time, as a transmission start time and a transmission end time to the ONU 220-W, and the ONU 220-W sends the uplink signal at timings complying with the commands. Therefore, the uplink signal which each individual ONU 220-W sends becomes a burst signal whose transmission is started at a certain time and whose transmission is stopped at another time.

In the PON 2002-W, round-trip communication time periods concerning the individual ONUs 220-W as have been obtained as the result of the ranging process are converted into the values of a parameter termed "Equalization Delay (EqD)" by, for example, the OLT 210-W, and the parameter values are notified to the respective ONUs 220-W. When each individual ONU 220-W receives the transmission command by a downlink frame from the OLT 210-W, it waits for a time period complying with the EqD, since the reception of the downlink frame, and thereafter, it transmits the burst signal toward the OLT 210-W at the timing of the transmission command given with reference to the wait. Since such operations are stipulated in the Recommendations (Non-patent Document 3), they shall be omitted from detailed description here. The OLT 210-W retains therein the EqD information items 211-W set for the individual subordinate ONUs. In a case where the communication time periods of the PON section 2002-W have fluctuated due to the expansions or contractions of the optical fibers, the parameter EqD is updated, and the maintenance thereof is performed so that the time multiplexing scheme may operate normally.

An OLT 210-P, an ONU 220-P, a power splitter 3020-P, a trunk fiber 2011-P, branch fibers 2021-P to 2023-P, a line 2031-P, a line 2032-P, and EqD information items 211-P which constitute a protection path have the same functions and operations as those of the working path.

A communication time period in the protection section 2001 is obtained in such a way that communication time periods for passing through the lines 2031-W and 2032-W are added to the delay time period measured in the PON 2002-W.

For the purpose of utilizing the path which includes the PON section, as a redundant path, the communication time periods of the working path 2010-W and the protection path 2010-P need to agree in a direction from the OAM adaptive NE 200-A toward that 200-Z. Likewise, in communications in the opposite sense, the communication time periods of both the paths need to be equal.

For the adjustments of the delay time periods of the working path and the protection path shown in FIGS. 1 and 2, this embodiment consists in a method in which the difference between the communication time periods of the working path and the protection path is directly measured, thereby to obtain the distinction. Concretely, the communication time periods of both the paths are measured between the OAM adaptive NEs 200-A and 200-Z, and the resulting difference is notified to the OLTs 210.

3. Operation of Embodiment 1

In order to incarnate Embodiment 1, the OAM adaptive NEs 200-A and 200-Z include delay DBs 300-A and 300-Z (refer to a delay DB 1292 in FIG. 7 to be stated later), respectively.

In Embodiment 1, the difference between the communication time periods of the working path 2010-W and the protection path 2010-P is measured, and it is fed back to the OLTs 210. In order to measure the difference between the communication time periods of both the paths, measuring frames are sent from the transmission side OAM adaptive NE 200-A or 200-Z of the protection section 2001, respectively and simultaneously to both the paths, and the arrival times of reception frames are compared in the reception side OAM adaptive NE 200-Z or 200-A, so as to grasp the difference of the communication time periods.

Operations in the case of measuring the communication time periods in the direction (uplink direction) from the OAM adaptive NE 200-A to the OAM adaptive NE 200-Z, are as stated below. The communication time period measuring frame which is transmitted from the OAM adaptive NE 200-A may be in any format as long as it can be identified by the reception side OAM adaptive NE. It is allowed to employ, for example, a Vendor Specific OAM frame, or a Continuity Check Message (CCM) frame for continuity check.

In order to compare the arrival times of the measuring frames received by the reception side OAM adaptive NE 200-Z, the OAM adaptive NE 200-A sends the communication time period measuring frames simultaneously to both the paths 2010-W and 2010-P. On this occasion, the frames to be sent are endowed with IDs which indicate the sending timing and the passing paths, in addition to the frame sort, so that they can be identified by the reception side OAM adaptive NE 200-Z. Incidentally, other identification information items such as sequence Nos. capable of identifying the delay measuring frames may well be employed instead of the path IDs, or sending timing identification information such as a sending time may well be employed instead of the sending timing ID. In this embodiment, the application of the CCM frame for the continuity check will be exemplified and described as the format of the communication time period measuring frame which is transmitted from the OAM adaptive NE 200-A. However, any format in which the reception side OAM adaptive NE can identify the measuring frame is substitutable. Even when the Vendor Specific OAM frame, for example, is used, the essence of the present invention is not affected.

In the OAM adaptive NE 200-Z, the combination of the frames whose arrival times are to be compared is judged from the passing path and the sending timing of the received measuring frame, and the difference between the arrival times is retained in the delay DB 300-Z and is notified to the OLT 210.

When the OLTs 210-W and 210-P are to start up the subordinate ONUs 220-W and 220-P, respectively, only the ONUs which exist under the respective OLTs are subjects for distance measurements. Therefore, the EqD information items 211-W and 211-P are determined with reference to those of the subordinate ONUs which exhibit the longest response time periods, that is, whose connection distances are the largest. In this embodiment, the communication time periods of both the paths constituting the redundant loop system are arbitrated and/or adjusted by considering in addition to the EqD information items 211-W and 211-P, the EqD information items 211 in the other loops constituting the redundant loops, respectively, and the communication time periods of the lines 2031 and 2032.

As the simplest arbitration and adjustment method, the arrival time period difference measured by the reception side OAM adaptive NE 200-Z of the protection 2001 is reflected on the loop of earlier arrival time, whereby the communication time periods of both the loops are equalized. It is difficult to conversely reflect the time period difference on the loop of later arrival time. The reason therefor is that the response time period of the ONU 220 to the OLT 210 is taken with reference to the farthest one of the ONUs 220 connected to the OLT 210. It is difficult to set the arrival time period difference at a value smaller than the EqD singly determined in each individual PON system (unless the set value of the EqD has an allowance). That is, if the arrival time of the measurement frame having passed through the working path is earlier, the communication time periods should desirably be equalized in such a way that the working EqD information 211-W is set to be larger than the protection EqD information 211-P by the corresponding component. On this occasion, a feedback employing the line 2032-W is notified from the OAM adaptive NE 200-Z to the OLT 210-W.

Conversely, in a case where the communication time period of the protection path is shorter, a similar feedback is notified through the line 2032-P, and the EqD information 211-P is altered.

Figure 3:
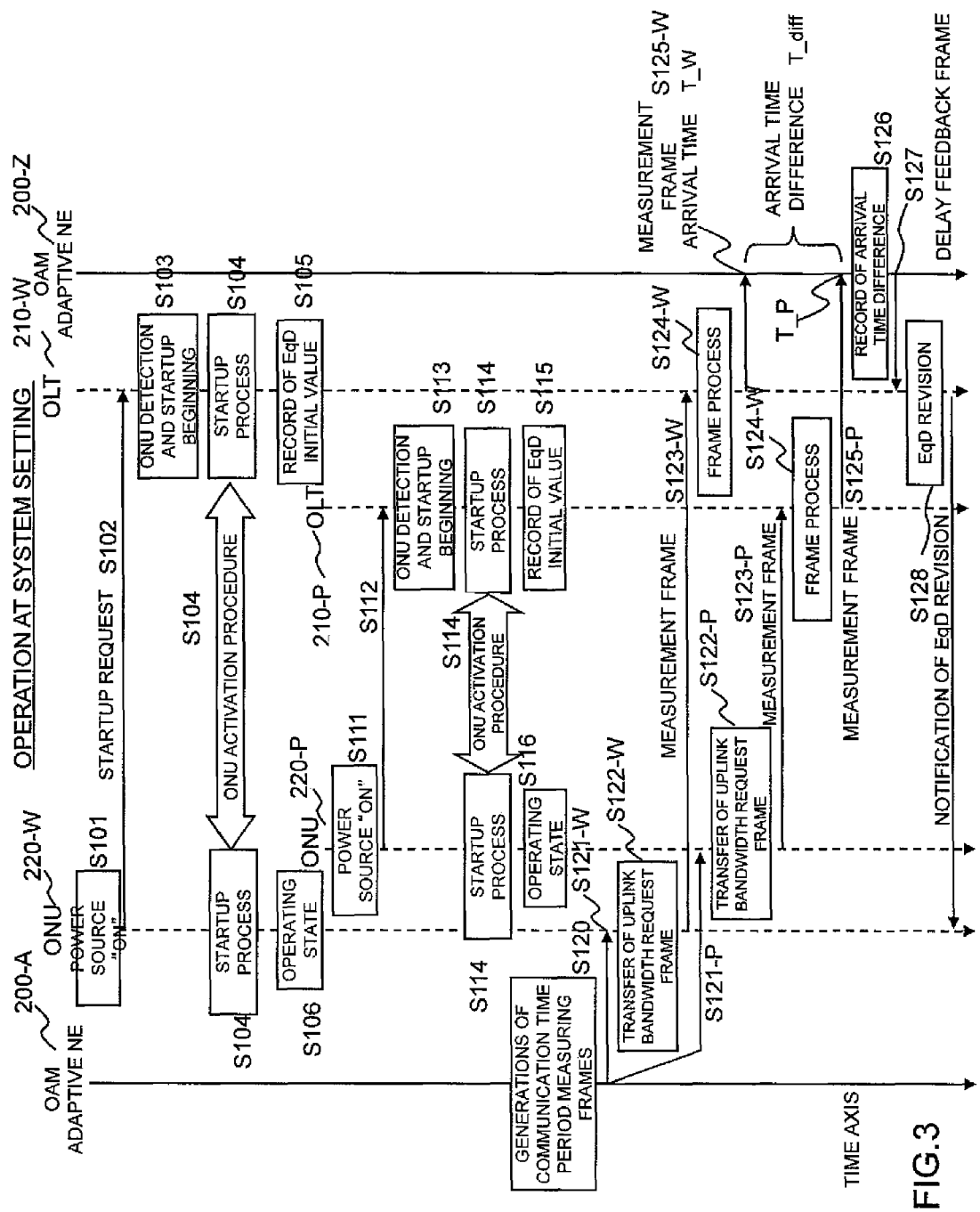
FIG. 3 is a sequence diagram showing the processing steps of a communication time period adjustment in a redundant system.

FIG. 3 is a sequence diagram showing the processing steps of the communication time adjustment in the redundant system.

This figure shows a process in which the EqD adjustment is reached after the PON systems have started up individually in the working system and the protection system.

Here, it is supposed by way of example that the working system starts up early. When the power source of the ONU 220-W is turned ON, the ONU 220-W senses a downlink frame sent from the OLT 210-W, and it forwards a startup process request to the OLT 210-W (S102). In the case of the G-PON (Non-patent Document 3), the transmission of a fixed pattern which is contained in the downlink signal from the OLT 210-W is regarded as a startup request S102. When the OLT 210-W receives the request, it detects the pertinent ONU 220-W on the basis of the fixed pattern or the like and begins its startup process (S103). The ONU 220-W is shifted into an operating state (S106) in accordance with a series of startup processing steps (S104) stipulated in Non-patent Document 3, etc. Substantially simultaneously by way of example, the OLT 210-W records in the EqD information DB 211-W (S105), the EqD set value for the ONU 220-W as acquired in the ONU 220-W startup process (S104).

The same applies also to the PON system which constitutes the protection path. A flow from the power source "ON" of the ONU 220-P (S111) to the shift thereof into an operating state (S116) is the same as in the description of the working PON, and shall therefore be omitted.

At the point of time when both the working and the protection paths have been established, the OAM adaptive NE 200-A forwards the communication time period measuring frames to both the paths (S121-W, and S121-P). On this occasion, the communication time period measuring frames are endowed with path IDs and sending timing IDs (S120). The ONU 220-W which has received the communication time period measuring frames requests the OLT to assign a bandwidth for transmitting data which contain the frame (S122-W). Upon receiving the request, the OLT 210-W adjusts an uplink bandwidth to be assigned to the ONU 220-W, by the DBA function, and it gives a transmission grant to the ONU 220-W (not shown, because this operation is as stipulated). When the transmission grant has been given, the ONU 220-W converts the communication time period measuring frame into a measurement frame for the optical access network, if necessary, and it sends the delay measurement frame to the uplink communication path (S123-W).

The OLT 210-W having received the delay measurement frame is converted from the PON section transfer format of the pertinent frame into a packet format for transfer toward the OAM adaptive NE 200-Z (S124-W), and it thereafter transfers the pertinent frame to the OAM adaptive NE 200-Z (S125-W). The reception time of the pertinent frame at the OAM adaptive NE 200-Z is denoted by "T_W".

Regarding the delay measurement frame S121-P sent from the OAM adaptive NE 200-A, processing steps on the protection path are the same as those on the working path and shall therefore be omitted from detailed description. Here, the reception time of the pertinent frame at the OAM adaptive NE 200-Z is denoted by "T_P".

When the OAM adaptive NE 200-Z receives both the delay measurement frames, it calculates the difference T_diff (correction magnitude) between the arrival times of the delay measurement frames from both the paths and records the calculated difference in the delay DB 300-Z. Incidentally, as the correction magnitude, a working or protection communication time period as stated later (refer to FIG. 11), or the like can be employed apart from the difference of the arrival times. When the OAM adaptive NE 200-Z records the arrival time difference T_diff, it transmits (S127) a packet which requests the OLT on a side requiring a revision, to revise the EqD information 211-W (delay information), substantially simultaneously with the record by way of example. The OLT on the side requiring the revision can be determined in such a way, for example, that the OAM adaptive NE 200-Z selects the loop of earlier arrival time with reference to the delay DB 300-Z. In the figure, a case where the OLT 210-W has been selected is shown by way of example. The pertinent packet S127 contains the revision magnitude of the EqD based on the arrival time difference, or the correction magnitude indicating the arrival time difference itself. The OLT 210-W having received the packet revises (S128) the EqD information corresponding to the ONU in the EqD information DB 211, in compliance with the content of this packet. In the operation of the PON system, the new EqD information obtained here needs to be notified, not only to the ONU 220-W having relayed the command from the OAM adaptive NE 200-A, but also to all the other ONUs. Therefore, the revised EqD information is notified to the subordinate ONU 220-W. The ONU side alters the setting of the EqD information in compliance with the command of the OLT 210-W, and continues its operation.

Incidentally, the case of revising the EqD information 211-W of the working path has been described here, but system operations can be similarly described also in a case where the revision of the protection path side is required.

Figure 12:
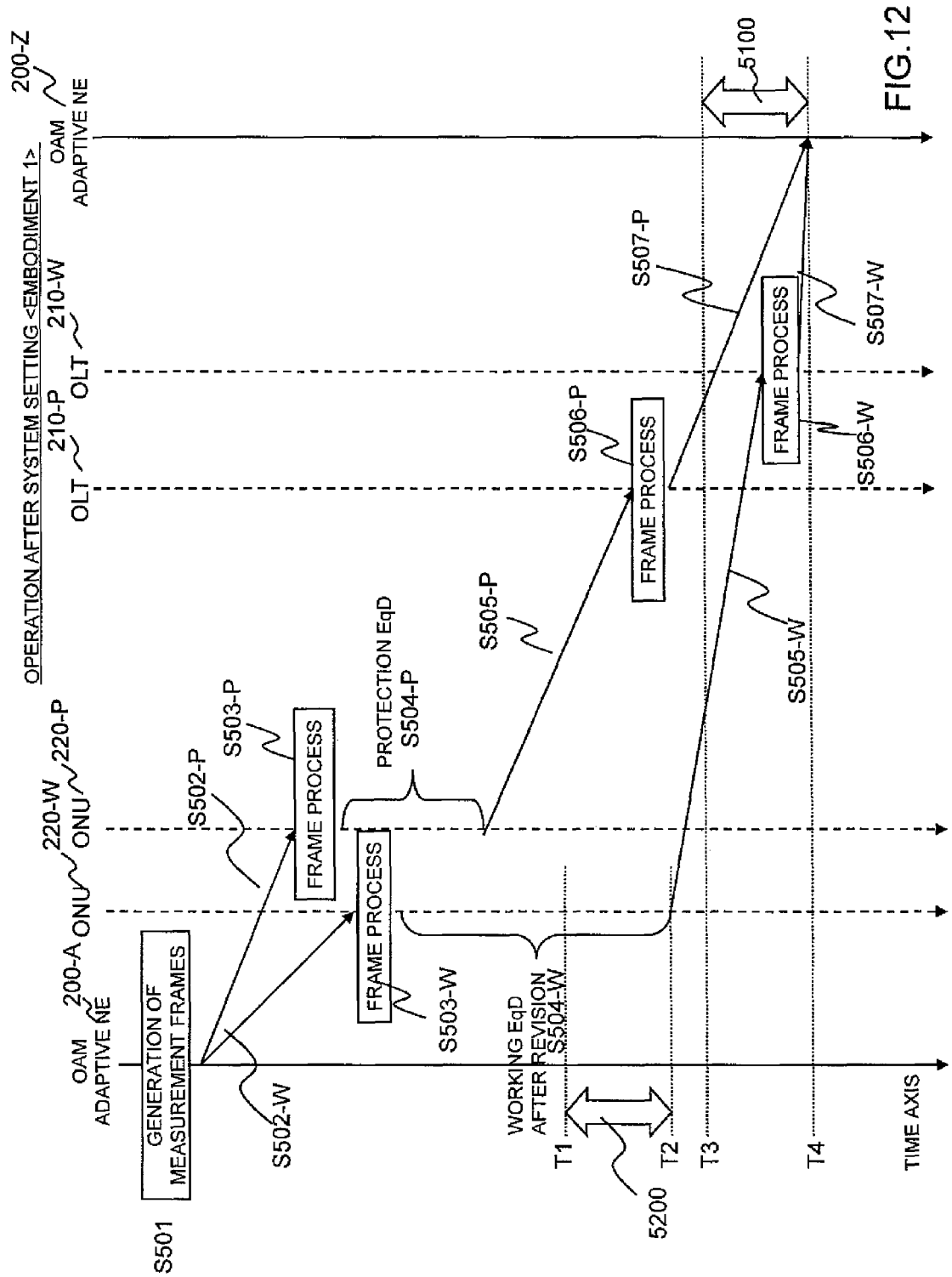
FIG. 12 is a sequence diagram for explaining a system operation after a delay time adjustment.

FIG. 12 is a sequence diagram for explaining a system operation after the delay time adjustment.

A case where the delay magnitude (delay information or EqD information) of the working system is adjusted, will be supposed and described in accordance with FIG. 3.

The OAM adaptive NE 200-A generates delay measurement frames (S501), and it transmits the delay measurement frames simultaneously to both systems of the working system and the protection system (S502-W and S502-P). The ONUs 220-W and 220-P receive the corresponding frames (S503-W and S503-P) and convert the measurement frames into PON section transmitting frame formats at the steps S504-W and S504-P of frame processes, respectively. As an example of a practicable process therefor, there is mentioned a process in which the measurement frame is capsuled in a GEM frame used in the GPON.

After the frame processes S504, the measurement frames capsuled in the GEM frames are transferred from the respective ONUs 220-W and 220-P to the OLTs at predetermined timings. The operations at this time comply with the EqD information items which are set in the ONUs from the respective OLTs. More specifically, after the ONUs 220-W and 220-P have been received the measurement frames, they make requests for uplink bandwidths to the OLT 210-W and the OLT 210-P to which they belong, respectively. The respective OLTs 210 notify transmission grants to the ONUs 220 in compliance with the requests. Wait time periods in which the ONUs 220 send the pertinent frames to the OLTs in response to the transmission grants, are retained in the ONUs 220 as the EqD information items. The EqD information items are adjusted in accordance with the flow chart of FIG. 6 to be stated later, and they are recorded in tables within the OLTs (refer to FIG. 5 to be stated later) and in the individual ONUs 220. This example indicates a case where the working ONU 220-W has been adjusted to transmit the delay measurement frame with a time delay of a time difference 5200.

The delay measurement frames transmitted from the ONUs 220-W and 220-P arrive at the OLTs 210-W and 210-P after communication time periods peculiar to the respective frames. In the OLTs 210, the received delay measurement frames are converted from the format for the PON section, into the original format, that is, the frame format which is used in the external network (S506-W and S506-P). The delay measurement frames which have been transferred from the respective OLTs 210 toward the OAM adaptive NE 200-Z subsequently to the frame processes S506, arrive at the OAM adaptive NE 200-Z simultaneously.

In the figure, an arrival time period difference 5100 is the difference between the required communication time periods of the working system and the protection system at a stage before the adjustment. When the frames are transferred without performing the EqD adjustment, the PON section transmission time period of the working system is shorter (the optical transmission distance is shorter), and the frame having passed through the working system arrives at the OAM adaptive NE 200-Z earlier. On this occasion, a frame transmission time from the on-line ONU 220-W is "T1". The arrival time difference 5100 of the CCM frame is reflected on the wait time period EqD in the ONU 210-W, and the transmission time from the ONU 220-W is altered to "T2". As a result, a time at which the frame arrives at the OAM adaptive NE 200-Z shifts from "T3" to "T4", and frame existence time periods within the protection sections of both the loops can be unified.

4. Device Configuration of OLT

Figure 4:
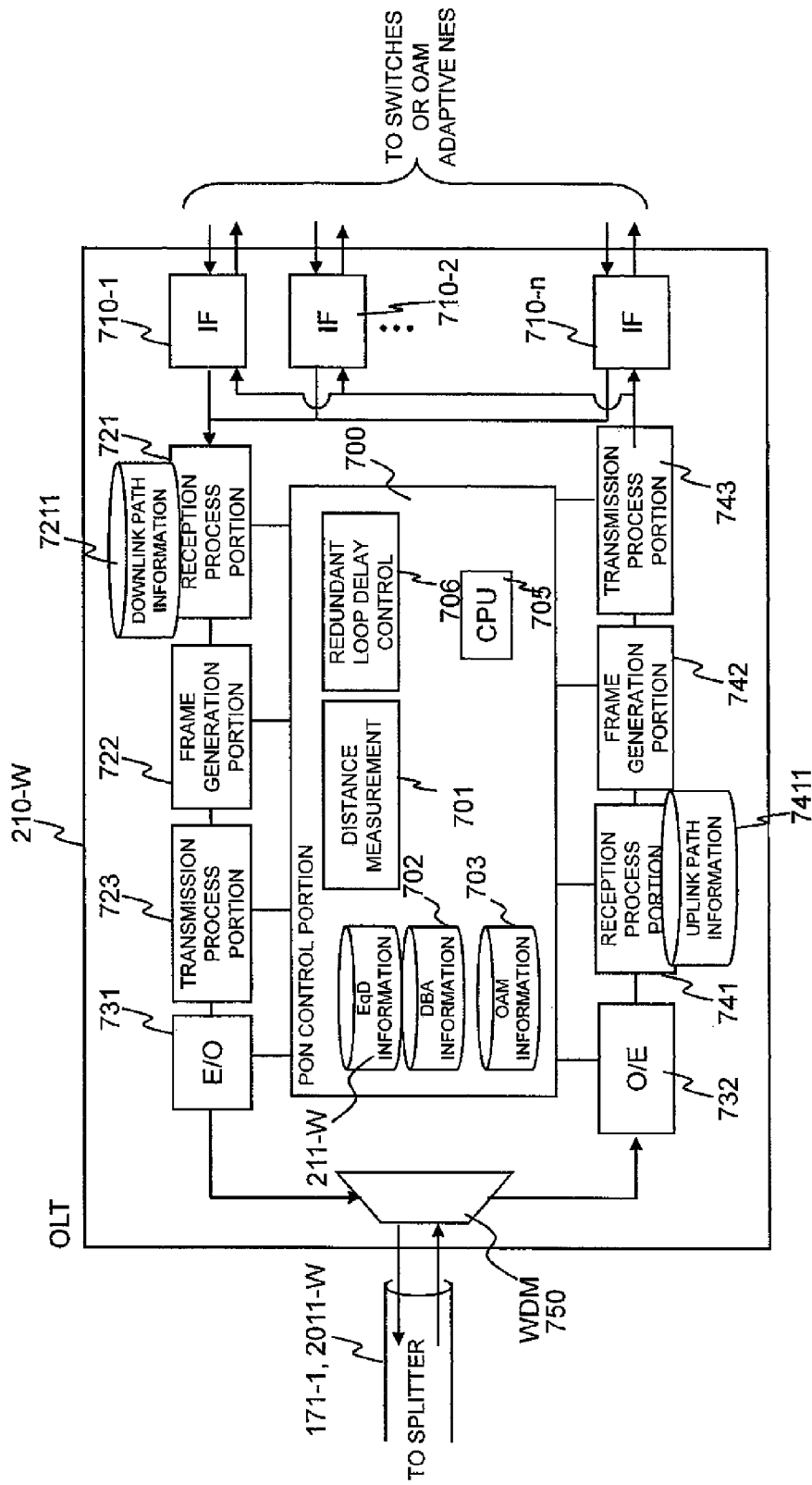
FIG. 4 is a device configurational diagram of a station side optical signal termination device (OLT)

FIG. 4 shows a device configurational diagram of a station side optical signal termination device (OLT).

FIG. 4 shows the fundamental functional block of the working OLT 210-W. Also the protection OLT 210-P is the same in the configuration of its functional block.

The OLT 210-W includes one or more packet network interfaces 710-1 to 710-$n$ as its host network side interfaces (Service Network Interfaces; SNIs). "Ethernet (registered trademark)" interfaces of 10/100 Mbps or 1 Gbps are often utilized for a packet transfer protocol.

Usually, the OLT 210-W is packaged in an Application Specific Integrated Circuit (ASIC) or a Field Programmable Gate Array (FPGA), and a plurality of OLT 210-W chips can be packaged in a housing installed on the station side. In case of such a configuration, there is considered an aspect where "Layer 2" switches (not shown) are disposed at a stage posterior to a plurality of interface boards bearing the OLT chips 210-W, and where packets are transferred to host devices through the "Layer 2" interface boards disposed on the SNI side behind the switches. On this occasion, the interfaces 710-1 to 710-$n$ included in the OLT 210-W are connected to the "L2" switches. Further, they are connected to the OAM adaptive NE (200-Z) through the switches and the "L2" interfaces. Alternatively, in case of adopting a simple configuration, the OLT 210-W and the OAM adaptive NE (200-Z) can be directly connected.

Now, operations will be described separately for a downlink communication and an uplink communication.

First, regarding processes for downlink signals, user data are inputted to the SNI side interfaces 710-1 to 710-n of the OLT 210-W through the relaying network 2000 (refer to FIG. 1) and the OAM adaptive NE 200-Z. The received data are transferred to a reception process portion 721 for downlink data, and their packet header information items are analyzed here. That destination ONU 220-W of a downlink frame to which a received packet is to be transferred is determined on the basis of flow identification information which contains destination information, transmission source information and path information contained in the packet header. Together with the determination of the destination information, the header information of the received frame is converted and bestowed if necessary. In order to determine the process which contains the destination determination and the conversion and bestowal of the header information, a downlink path information DB 7211 included in the reception process portion 721 is referred to. The downlink path information DB 7211 is a database for determining frame processes with a trigger being one or more parameters which contain(s) the header information VLAN ID and MAC address of the received frame.

In a frame generation portion 722, the received frame is altered into a frame format for the PON section transfer, in compliance with header process contents determined by the reception process portion 721. Concrete processes in the case of utilizing the G-PON (Non-patent Documents 1 to 3) and the "Ethernet (registered trademark)" differ depending upon contents stated in the path information DB 7211. By way of example, the processes include VLAN tag processes (conversion, deletion, permeation and bestowal) for the received "Ethernet (registered trademark)" frame, the generation of a GEM header containing a Port-ID set in the transfer destination ONU, the capsuling of the received "Ethernet" frame into the GEM frame, etc.

A transmission process portion 723 executes processes for sending the GEM frame generated in the frame generation portion 722. The processes include queuing in which a frame processing priority is considered, as well as a readout process, and the synthesis and sending of the downlink frame for the PON section. In the case of the G-PON, a downlink frame transmission cycle exists every 125 microseconds, and a downlink frame common header which contains a fixed pattern for synchronously accepting the downlink frame on the ONU side is required at the beginning of the cycle (downlink frame). The downlink frame is formed by inserting a plurality of GEM frames in continuation to the common header (Non-patent Document 3).

Lastly, the downlink frame read out by the transmission process portion 723 is converted into an optical signal by an E/O process portion 731, and the optical signal is sent to the ONU 220-W through a WDM 750 and an optical fiber 171-1.

Processes for an uplink signal are in a form in which the processes for the downlink signal are executed in a reverse order. The uplink signal is transmitted from the ONU-220W in compliance with a timing designated by the OLT 210-W, and it is multiplexed by the time division scheme on the optical fiber 171-1 where optical signals are concentrated. Therefore, the optical signals transmitted from the individual ONUs 220 become burst states which are intermittently transmitted.

The optical signal which has been received through the optical fiber 171-1 and the WDM filter 750 is clock-synchronized and frame-synchronized (frame termination of the PON section) on the basis of a preamble which is bestowed on the head of the burst signal received by an O/E portion 732, and a fixed pattern which is called a "delimiter". A clock extracted here is used for checking the operation of the PON system. More specifically, the frame head position (reception timing) obtained here must agree with a transmission command for the pertinent ONU 220 as is retained as DBA information 702 in the PON control portion 700 of the OLT 210-W. When, as the result of the check, any difference from a communication time given as a command by the OLT 210 is observed, the distance measurement portion 701 of the PON control portion 700 revises the component of a detected fluctuation value and judges the propriety of an operation continuation. That is, in a case where a fluctuation of, at least, a predetermined threshold value has been observed, the revision of the setting of the EqD information is notified to the pertinent ONU 220 by the subsequent downlink frame. The EqD information items of the individual ONUs 220 under the OLT 210-W are retained as EqD information 211-W in the PON control portion 700. In a case where the situation cannot be coped with by the revision of the set value, the pertinent ONU 220 is subjected to a ranging process again by the command of the distance measurement portion 701, so as to update the EqD information 211-W.

The uplink frame received by the O/E portion 732 is transferred to a reception process portion 741. Here, the header information of the uplink frame is analyzed, so as to determine the contents of a header information process and the transfer destination of this frame. The transfer destination determination on this occasion is permitted by referring to an uplink path information DB 7411. The header process contents and the frame transfer destination can also be determined by referring to the "Layer 2" header information of the frame, but especially capsule header information for the PON section transfer becomes an important parameter here. When the case of the G-PON is taken as an example, one or more Port-ID information items assigned every ONU are generally employed as a trigger for determining the header process contents and the frame transfer destination. Of course, the GEM header information and the "L2" information can also be combined as a trigger for searching the path information DB 7411. In the same manner as in the case of the downlink data process, also the processed contents of the "L2" header information can be contained in the uplink path information DB 7411. The packet format of the GEM frame becomes unnecessary after the GEM frame has been terminated by the reception process portion 741. Payload information conveyed by the GEM frame is used for rebuilding transfer information in a frame generation portion 742.

In the frame generation portion 742, a packet processed in the reception process portion 741 is converted into a format complying with a packet transfer protocol (in this embodiment, "Ethernet (registered trademark)") and is transferred to a transmission process portion 743. Besides, when a frame is generated within the OLT 210 in such a case where a frame transmission is notified from the PON control portion 700, the frame is configured anew by the frame generation portion 742, and the generated frame is transferred to the transmission process portion 743.

An operating example in the frame transfer mode will be mentioned below. The "L2" header information is processed on the basis of the header information of the GEM frame in the reception process portion 741, and a header (internal header) for an internal process such as the identification of the user (ONU 220) is rewritten within the apparatus, whereupon the frame is transmitted to the frame generation portion 742. In the frame generation portion 742, the internal header is deleted, and a revision or the like necessary process is performed in a case where an error has been found out in frame information on account of a transmission error, whereby the "Ethernet (registered trademark)" frame is shaped.

Since the function of the transmission process portion 743 is the same as that of the downlink transmission process portion 723, it shall be omitted from description. The frame having passed through the transmission process portion 743 is sent through the SNI side interfaces 710-1 to 710-*n*. Thereafter, the frame is transmitted to the OAM adaptive NE 200-Z directly or through an "L2" switch or the like relaying device disposed outside the OLT 210-W.

Next, a delay control process in the OLT 210-W will be described. This operation is employed in case of measuring the communication time period between the device (OAM adaptive NE 200-A or 200-Z) outside the PON section and the OLT 210 or ONU 220. A device configuration in which the OLT 210-W and the OAM adaptive NE 200-Z are unitary as is connected by an inter-device bus can also be adopted for the connection with the OAM adaptive NE 200, even when a general-purpose protocol such as "Ethernet (registered trademark)" is used through the SNI side interfaces 710-1 to 710-*n*. Here, a situation where such an OLT is connected by the "Ethernet (registered trademark)" in accordance with the configuration of Embodiment 1 will be supposed and described by way of example.

Besides, in Embodiment 1, the CCM frames of the Ether OAM are employed for the measurements of the communication time periods, and the VSM (Vendor Specific Message) frames of the Ether OAM are used for the notifications of the delay time difference from the OAM adaptive NE 200-Z to the OLT 210 and from the OAM adaptive NE 200-A to the ONU 220. Therefore, the term "OAM frames" below shall signify the general control frames in which the above frames are put together.

First, there will be described the operation of the OLT 210-W in the case of measuring the difference of the communication time periods in the uplink direction.

When the power source of the ONU 220-W is turned ON, this ONU 220-W receives the downlink frame delivered to the PON section by the OLT 210-W and recognizes this OLT 210-W, whereupon it forwards a startup process request to the OLT 210-W. Upon accepting the request, the OLT 210-W begins a startup process for the pertinent ONU 220-W. The OLT 220-W measures a round-trip communication time period with respect to the ONU 220-W in accordance with the series of steps of the startup process (refer to the step S104 in FIG. 3) stipulated in Non-patent Document 3, etc., it determines a reference point serving as the time reference of an uplink time multiplexing scheme in the whole subordinate system, with reference to round-trip communication time periods with the other ONUs under the OLT 210-W, and it determines EqD setting values which are to be notified to the respective ONUs. The determined EqD setting values of the respective ONUs 220 are retained in the EqD information DB 211-W (refer to the step S105 in FIG. 3).

After both the paths of the working system and the protection system have been established, the OAM adaptive NE 200-A transmits to both the paths, the communication time period measuring frames endowed with path IDs and sending timing IDs. The ONU 220-W having received the communication time period measuring frame requests the OLT 210-W to assign an uplink bandwidth for transferring the pertinent frame. The OLT 210-W having received the request adjusts the uplink bandwidth which is to be assigned to the ONU 220-W, updates the DBA information 702 and gives the ONU 220-W an uplink signal transmission time slot. The ONU 220-W forms a measurement frame by converting the communication time period measuring frame if necessary, and it transmits the measurement frame to the OLT 210-W. The OLT 210-W which has received the measurement frame from the ONU 220-W by the series of above processing steps, converts the PON section transfer format of the pertinent frame into a packet format for transfer toward the OAM adaptive NE 200-Z and thereafter transfers the pertinent frame to the OAM adaptive NE 200-Z.

When the OAM adaptive NE 200-Z receives the measurement frames from both the paths, it calculates the difference T_diff between the arrival times of the measurement frames from both the paths and records it in the delay DB 300-Z (delay DB 1292: refer to FIG. 7 to be stated later) (refer to the step S126 in FIG. 3). Substantially simultaneously with the record by way of example, the OAM adaptive NE 200-Z transmits a packet for making a request for the revision of the EqD information 211-W, to the OLT on a side on which the revision is required (refer to the step S127 in FIG. 3). The pertinent packet (delay feedback frame S127) contains a correction magnitude which denotes the revision magnitude of the EqD based on the arrival time difference, or the arrival time difference itself. When the OLT 210-W receives the delay feedback frame, it revises the EqD information 211-W indicating a wait time period in the ONU, in accordance with the content (correction magnitude) of the packet (refer to the step S128 in FIG. 3). Further, the OLT 210-W notifies the revised EqD information 211-W to the subordinate ONU 220-W.

Incidentally, when the OLT 210-W receives the OAM frame from the OAM adaptive NE 200-Z, the reception process portion 721 recognizes that the received frame is the OAM frame, from the "L2" header information of the pertinent frame. The OLT 210-W having received the revision request readjusts the distance in consideration of the pertinent revision value, by the distance measurement portion 701, and it updates the EqD information 211-W. Subsequently, the OLT 210-W distributes the new EqD information to all the subordinate ONUs 220.

FIG. 5 shows diagrams of configurational examples of the EqD information database which is retained in the OLT 210-W.

Here, three examples (A) to (C) are shown as a method for configuring the EqD information database.

The example (A) in FIG. 5 is the fundamental configuration of the EqD information database which is employed in the conventional PON. This example contains ONU IDs 510, and EqD values 550 which are set in the respective ONUs. The example (B) in FIG. 5 is an example in which path IDs 520 that are set for the respective ONUs 220 are employed instead of the ONU IDs 510. The path IDs 520 can be acquired from, for example, path information 1294. EqD values 550 are the same as in the example (A) of FIG. 5. On this occasion, as the path ID 520, a plurality of IDs can also be assigned each ONU. In the examples (A) and (B) of FIG. 5, accordingly, the numbers of necessary entries are sometimes different. The example (C) in FIG. 5 is an example which contains both the ONU IDs 510 and the path IDs 520. With a table in the example (C) of FIG. 5, the EqD value 550 can be referred to by employing a necessary parameter which may be either the ONU ID 510 or the path ID 520. Incidentally, a field into which a flag for indicating either of the IDs to be used as a key is inserted may well be added to the table.

Figure 6:
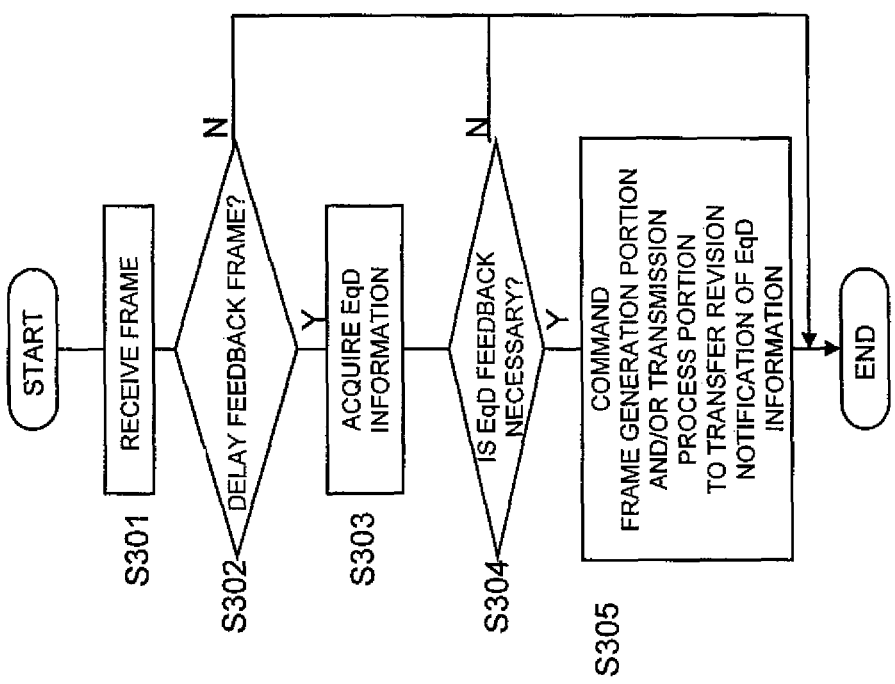
FIG. 6 is an operating flow chart in a PON control portion within an OLT 210-W for revising the difference of communication time periods in an uplink direction.

FIG. 6 is an operating flow chart in the PON control portion within the OLT 210-W for revising the uplink direction communication time period difference.

When the PON control portion 700 of the OLT 210 receives a frame reception notification from the reception process portion 721 concerning an uplink signal (S301), it checks whether or not the received frame is a delay feedback frame (refer to the step S127 in FIG. 3) from the OAM adaptive NE 200-A concerning an EqD information revision (S302).

In case of the delay feedback frame for the EqD information revision notification, the PON control portion 700 extracts EqD information from an EqD revision magnitude contained in the pertinent frame information or a correction magnitude expressing an arrival time difference (S303). On this occasion, the subsequent processing corresponds to the step S128 in FIG. 3.

The PON control portion 700 subsequently decides whether or not the EqD information 701 in this PON control portion 700 is to be revised (S304). In a case where the EqD information 701 is to be revised (if necessary, after an EqD readjustment), for example, where a timing for the revision has been reached, the PON control portion 700 updates the EqD information 701 and notifies the updated EqD information to all the subordinate ONUs 220 (S305). Fundamentally, the EqD information is set every ONU. In this embodiment, as an application example, the EqD information of each path set every ONU can also be set as shown in FIG. 5.

5. Device Configuration of OAM

Figure 7:
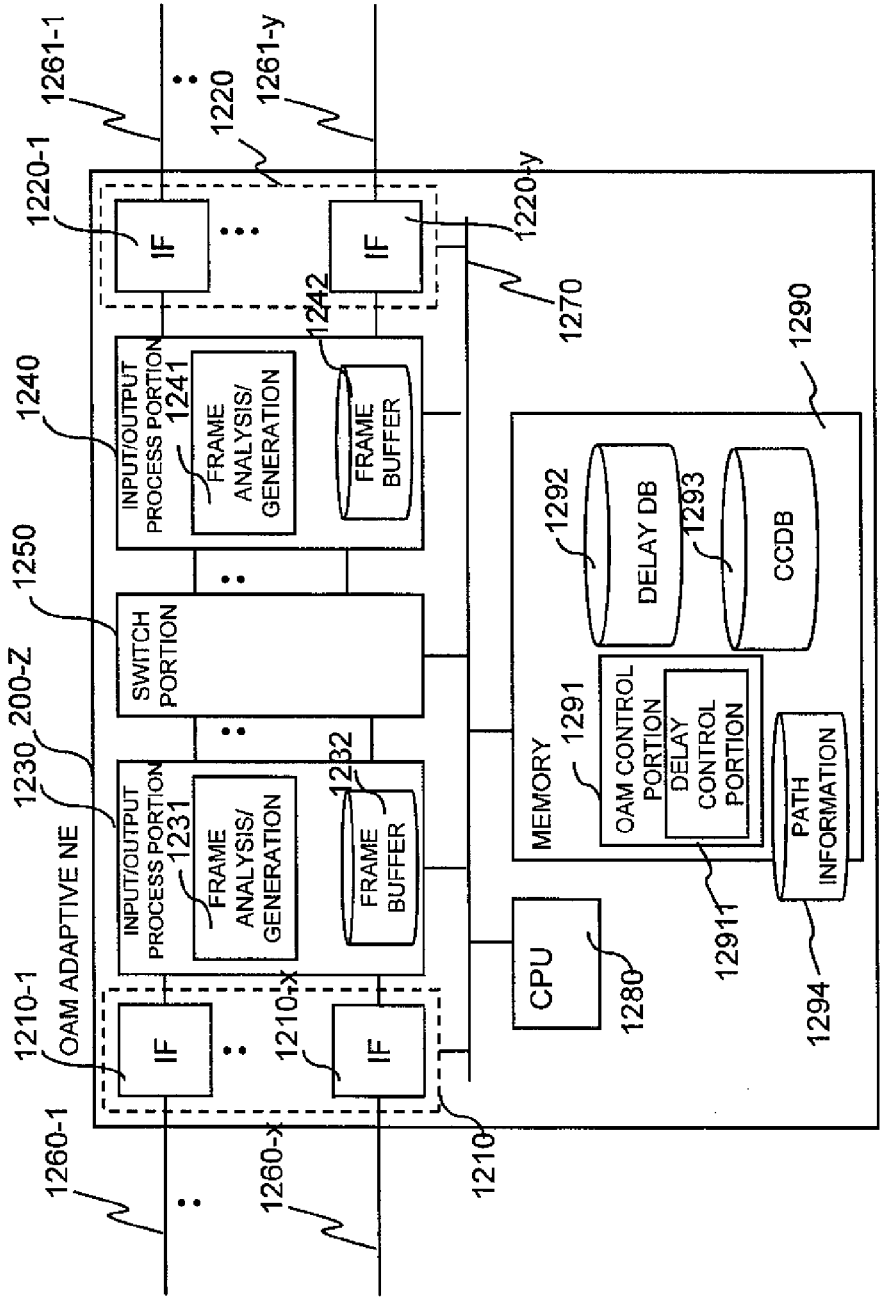
FIG. 7 is a configurational diagram of an OAM adaptive NE 200.

FIG. 7 shows a configurational diagram of the OAM adaptive NE 200.

The OAM adaptive NEs 200 are disposed at both the ends of the protection section so as to define this protection section, and regarding packets passing through the section, they determine utilized paths with reference to header information items.

The OAM adaptive NE 200-Z, for example, includes interfaces 1210-1 to 1210-x on the side of an optical access system, an input/output process portion 1230, a switch portion 1250, interfaces 1220-1 to 1220-y on the side of the relaying network 2000, an input/output process portion 1240, a CPU 1280, and a memory 1290. Besides, regarding the OAM adaptive NE 200-A, the optical access side and the relaying network side which are the connection destinations of the interfaces may be replaced with each other. Since both the NEs are the same in the functional configuration, the OAM adaptive NE 200-Z shall be supposed and described by way of example here.

The OAM adaptive NE 200-Z regularly receives a CCM frame from the OAM adaptive NE 200-A, by utilizing the uplink frame of the PON section. In the working path 2010-W, the frame having passed through the PON section is received by any of the interfaces 1210-1 to 1210-x of the OAM adaptive NE 200-Z. The OAM adaptive NE 200-Z grasps a path state with reference to information contained in the OAM frame.

A communication in the uplink direction (a direction from left toward right in FIG. 2) will be exemplified and described. The packet received by any of the interfaces 1210-1 to 1210-x is transferred to the input/output process portion 1230. In the input/output process portion 1230, the packet is temporarily stored in a frame buffer 1232 for the purpose of a packet transmission control containing a header process, the assignment of a priority degree, etc. The check of the header information, and the process of the header information triggered by a parameter contained in a header (such as conversion, permeation, endowment, or deletion) are executed in a frame analysis/generation portion 1231 by utilizing a wait time period involved. Here, path information 1294 set in the OAM adaptive NE 200-Z is referred to for header analysis/generation. The input/output process portion 1230 accesses the memory 1290 in order to refer to the path information 1294, but part of the path information can also be retained in the input/output control portion 1230 for the reason of packaging.

Anyway, the flow of the operation does not change. Incidentally, this embodiment indicates an example in which a bus 1270 is utilized for the exchange of signals within the device.

The frame which has been processed so as to afford header information appropriate for a transfer destination, by the frame analysis/generation portion 1231, is sent to the switch portion 1250 for the transfer thereof toward a destination path.

In the switch portion 1250, the individual frames are transferred to routes corresponding to their respective destinations. After having been transferred to the routes, the frames are subjected to queuing and to the check and alteration of the header information if necessary, in accordance with the priority degrees of these frames and the path information items of the respective routes. Functions for these processes are incarnated by a frame analysis/generation portion 1241 and a frame buffer 1242 which are disposed on the sending side. The frames read out by the input/output process portion 1240 are sent out through the interfaces 1220-1 to 1220-y.

There will be described a path management method for the uplink direction communication mode in the OAM adaptive NE 200-Z. The input/output process portion 1230 decides in the reception frame analysis/generation portion 1231, whether or not the frame received by any of the interfaces 1210-1 to 1210-x is the OAM frame (delay measurement frame S125-W). In a case where the received frame is the OAM frame (delay measurement frame S125-W), the path ID and sending timing ID of the redundant loop as are contained in the pertinent frame are extracted, and these information items are notified to an OAM control portion 1291 in the memory 1290. A series of processing steps for comparing arrival times as to the delay measurement frames from both the paths and for determining delay time period correction magnitudes in the individual paths, are performed by a delay control portion 12911 in the OAM control portion 1291.

The identification information items (path ID and transmission timing ID) of the delay measurement frame, and the arrival time thereof are retained in the delay DB 1292 as a series of data. The information items are overwritten in a case where the same sorts of information items have been acquired anew every path (connection). By the way, in a case where the reception frame has not been received from its correct path, that is, where the identification information contained in the reception frame and the path information 1294 do not agree, the pertinent frame is discarded, and a predetermined alarm is notified to the CPU 1280.

An OAM frame which is used for monitoring a path that connects the OAM adaptive NEs 200-A and 200-Z is terminated at the OAM adaptive NE 200-Z. Therefore, in a case where the received frame is the OAM frame, the pertinent frame is transferred to the memory 1290, and the analysis of the OAM frame is made in the memory 1290. On this occasion, the pertinent frame is not transferred to the switch portion 1250. Since also the delay measurement frame falls within this category, it is similarly processed.

By way of example, a frame configuration (refer to FIG. 8 to be stated later) based on a continuity check frame (CCM frame) is supposed as the delay measurement frame. Then, the scheduled arrival time or reception cycle of the CCM frame in each individual path is determined at a service setting stage. This information is stored in a CCDB 1293, together with each individual path ID. Separately from the OAM information (OAM setting information), settings concerning the passing path of the frame, namely, the header information of the reception frame and information items concerning the association of the header process and transmission route for the header information, are retained as the path information 1294. An operation is such that, after the path information 1294 has been set, the CCDB 1293 is configured so as to reflect the setting, and that the corresponding entry of the CCDB 1293 is updated each time the CCM frame is received.

The difference of the arrival times of the delay measurement frames (refer to FIG. 8 to be stated later) stored in the delay DB 1292 is obtained by comparing the frames which have the different path IDs and the identical transmission timing ID, and the path to be revised and the magnitude of the revision are determined in order to revise the time difference. Since a transmission interval can be regarded as being fundamentally the same as a reception interval, the value of the revision magnitude may be considered as being substantially reflected on a transmission timing though some allotment arises actually.

As soon as the OAM adaptive NE 200 has determined the path and revision magnitude to-be-sent, it sends the opposing OAM adaptive NE 200 the revision notification of the correction magnitude of a parameter relevant to a transmission process. After the frame of this notification has been generated in the memory 1290, it is transferred to the input/output process portion 1240 and is sent through the sending interface 1220 and a transmission line 1261. Incidentally, the transmission interface 1220 and the transmission line 1261 sometimes utilize the same media as the input interface 1210 and an input line 1260 as physical lines, respectively.

In the redundant path including the PON, the control of a frame transmission timing has the feature that the optical layer and the TC and "L2" layers cannot be divided. Owing to the use of this scheme, therefore, the transmission and reception timings of the frames which pass through both the paths can be adjusted, and the path protection in which the access network is made redundant can be caused to function in practical use.

Figure 8:
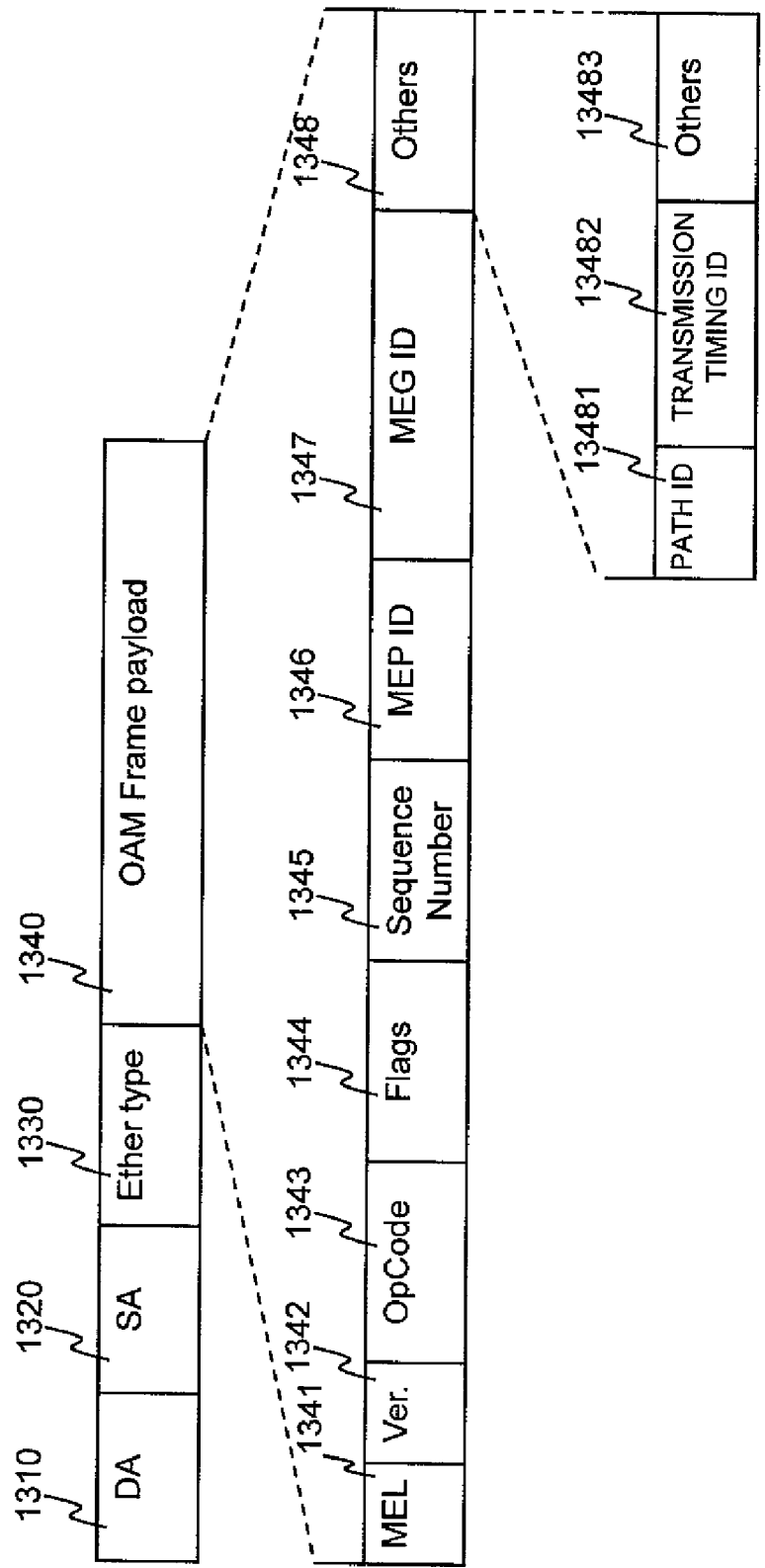
FIG. 8 is a diagram of a configurational example of a delay measurement frame which is transmitted from the transmission side OAM adaptive NE 200-A to the transmission side OAM adaptive NE 200-Z.

FIG. 8 shows a diagram of a configurational example of the delay measurement frame which is transmitted from the transmission side OAM adaptive NE 200-A to the transmission side OAM adaptive NE 200-Z.

The configurational example is based on the CCM frame format defined in the Ether OAM Recommendation (Non-patent Document 5), by way of example.

The frame contains as "L2" information items, a destination address (DA; Destination Address) 1310, a transmission source address (SA; Source Address) 1320, a frame type (Ether Type) 1330, and a payload 1340. Any device having received this frame judges a frame sort by referring to a predetermined Ether Type field value which denotes the OAM frame.

The CCM frame information is stored in the part of the payload 1340. Concretely, the payload 1340 contains a MEG level (identification information which indicates a logic path at a still finer hierarchy as is set within a path to-be-monitored called "Maintenance Entity") 1341, version information 1342, a code number "OpCode" 1343 which indicates that the pertinent frame is the CCM frame, Flags 1344 which indicates the transmission cycle and other additional functional information of the CCM frame, a sequence number field (* at present, fixed to all "0" in the recommendation) 1345, "MEP ID" (1346) which indicates the ID of a device having sent the CCM frame, the logical identification information "MEG ID" (1347) of the path to-be-monitored in the Ether OAM, and other control fields 1348.

The delay measurement frame for use in this embodiment utilizes, for example, part of the control field 1348. A path ID (ID which indicates either the working system or the protection system) 13481, and a transmission timing ID 13482 are inserted here. In some packaging aspects, the path ID may well be judged by combining the "MEP ID" (1346) and the "MEG ID" (1347) which are contained in the CCM frame. In this case, however, a process for collating the path ID with the path information 1294 within the OAM adaptive NE 200 is required. Since information substituting the transmission timing ID is not contained in the existing protocol, it needs to be added anew.

Figure 9:
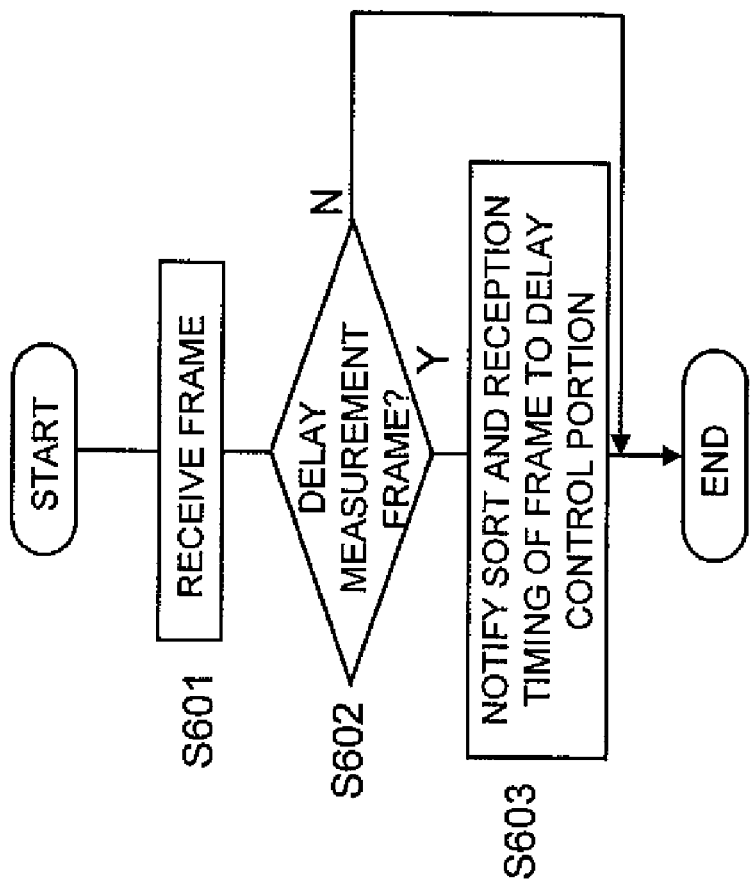
FIG. 9 is a flow chart showing a frame process in the input/output process portion of the OAM adaptive NE.

FIG. 9 is a flow chart showing a frame process in the input/output process portion of the OAM adaptive NE.

In a case where the input/output process portion 1230 or 1240 has received a frame (S601), it decides whether the frame is an OAM frame (delay measurement frame) or an ordinary data frame (S602). On this occasion, if the frame is the OAM one, the input/output process portion 1230 or 1240 records the sort and reception timing of the OAM frame and notifies them to the delay control portion 1292 (S603).

In a case where the frame has been decided as the data one in the reception frame decision S602, the input/output process portion 1230 or 1240 executes the header process of the pertinent frame and the transfer thereof to the switch 1250 and performs an ordinary transfer process.

Figure 10:
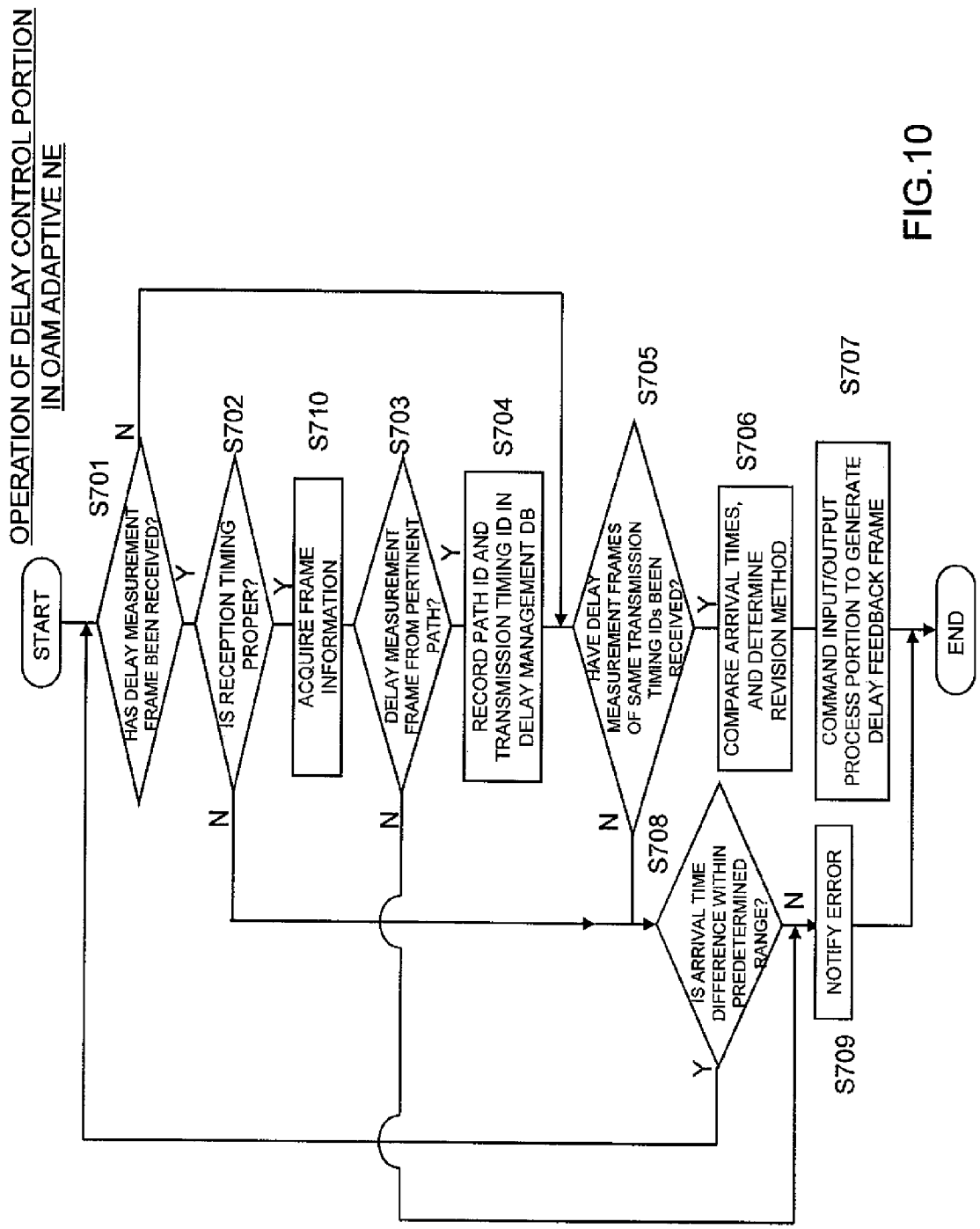
FIG. 10 is a flow chart showing a delay measurement frame process in the delay control portion of the OAM adaptive NE.

FIG. 10 is a flow chart showing a delay measurement frame process in the delay control portion of the OAM adaptive NE.

In this flow chart, the delay control portion 12911 begins the process in compliance with a trigger which is inputted every fixed cycle, or from a manager or the like. The delay control portion 12911 is kept monitoring the reception situation of reception frame information from the input/output process portion 1230 (S701), and it checks whether or not the delay measurement frame has been received. In a case where the delay measurement frame has been received, the delay control portion 12911 checks whether or not a predetermined time has lapsed since an estimated time for the reception of the pertinent frame (or since the reception time of a frame from the other path as contains the same transmission timing ID (S702). If the reception is at an effective timing, the delay control portion 12911 extracts (acquires) and checks information contained in the pertinent frame (S710). Incidentally, regarding the propriety of the reception time, the decision is difficult in a case where the delay measurement frame is received from neither of the paths. It is therefore possible to employ a method in which the reception of the delay measurement frame from one path is set as a trigger, or in which the arrival time of the delay measurement frame to be received next is estimated from the arrival time of the delay measurement frame received before, in consideration of the cyclicity of the CCM.

After having acquired the frame information, the delay control portion 12911 checks whether or not the pertinent frame is a normal frame conforming to the settings of the redundant loop system (S703).

Here, in a case where the delay control portion 12911 has received any frame differing from a path setting situation, it issues an error indicating to that effect (S709) and ends the processing. On the other hand, in case of the normal delay measurement frame, the delay control portion 12911 stores the path ID and transmission timing ID contained in the pertinent frame, and received information such as the reception time of the pertinent frame, in the delay information DB 1292 (S704).

Here, in a case where the delay measurement frames having the same transmission timing IDs have already been received from both the paths of the working system and the protection system (decision at S705), the delay control portion 12911 compares the arrival timings of the delay measurement frames from both the paths and determines a delay revision method for causing transfer time periods to agree (S706). The delay control portion 12911 selects, for example, the path along which the frame has arrived earlier, and it executes a process for transmitting a correction magnitude to the OLT of the selected path. Subsequently, the delay control portion 12911 notifies the generation of a delay feedback frame containing the correction magnitude for the delay revision, to the input/output process portion 1240 (S707).

By the way, in a case where the delay control portion 12911 is receiving only the frames from one path, it further waits till the arrival of a frame to-be-compared (S708) in a case where a predetermined (allowable) arrival time difference is not exceeded till the arrival of the frame to-be-compared. Besides, in a case where the predetermined arrival time difference has been exceeded during the wait of the reception from the other path, that is, in a case where the operation has proceeded from the step S701 to the step S705 and where a timer end has been confirmed at a step S708, an error is issued (S709), and the process which concerns the delay measurement frame having the pertinent path ID and transmission timing ID is ended.

FIGS. 11A and 11B show configurational examples of the delay database 1292 of the OAM adaptive NE 200. This database corresponds to the delay DB 1292 in FIG. 7.

FIG. 11A shows the state of the database which is generated at the start time point of a delay measurement (immediately after the startup of the ONU, that is, before the adjustment of a communication time period, etc.), while FIG. 11B shows the state of the database after the adjustment of a communication time period difference.

The path ID 1610 is the same information as set as the path information 1294. The reason therefor is that any OAM frame from a path which is not registered as the path information 1294 is discarded in the input/output process portion 1230 or the OAM control portion 1291. The transmission timing ID 1620 which is inserted at the sending of a delay measurement frame is used as a search key in the search of this table, together with the path ID 1610.

The arrival times 1630 and 1640 of the delay measurement frames are notified to the delay control portion 12911 in such a way that the frames received by the interfaces 1210 (or 1220) of the OAM adaptive NEs 200 connected with the respective paths are analyzed by the input/output process portions 1230 (and 1240) corresponding to the respective paths. After the delay measurement frames have been received from both the working system and the protection system by the delay control portion 12911, the arrival time difference 1650 between them is calculated. The delay control portion 12911 notifies the transmission time adjustment(s) for either or both of the paths of the working system and the protection system, on the basis of the arrival time difference 1650, to the OLT 210-W or 210-P by way of example, by a delay feedback frame. Here, the delay feedback frame contains the correction magnitude, for example, the arrival time difference, or a working or protection delay time period (EqD revision magnitude) in which the arrival time difference is added.

By the way, in packaging, each entry may well contain the calculation of the arrival time difference and flag information (not shown) which indicates whether or not a delay revision command has been forwarded. Besides, the receptions of the delay measurement frames of both the working system and the protection system need to be checked before the delay time difference 1650 is calculated. It is therefore preferable to provide a flag (not shown) which indicates whether or not frames have been received from the respective paths.

In FIG. 11A, it is assumed that, in a case where the path ID 1610 is "1", the time period difference between both the loops as obtained by subtracting the communication time period of the protection system from the communication time period of the working system is "−dt1". On this occasion, the path 2 has the longer communication time period, and hence, the delay of the working system is adjusted in adaptation to the communication time period of the protection system. The content of the adjustment is to increase the communication time period of the working system by "dt1" as indicated in FIG. 11B. On the other hand, regarding the path ID "2", it is indicated that the communication time period of the working system side is longer. This situation is coped with by adjusting the communication time period of the protection system side.

Incidentally, the path ID may well be replaced with other identification information such as a sequence number capable of identifying the delay measurement frame. Also, the sending timing ID may well be replaced with a sending time.

6. Functional Addition

A functional addition for bestowing a feature on Embodiment 1 of the present invention will be described below.

In Embodiment 1, the OAM adaptive NE of the reception side decides the difference between the communication time periods on the paths, with reference to the frame from the opposing OAM adaptive NE as has been received through the PON section (refer to FIG. 12, etc.). As the reason why the additional function of this embodiment is necessary, it is mentioned that there is supposed a case where a communication state in the packet communication network which connects the PON section and the OAM adaptive NE is not so stable as in a conventional synchronous network. In this embodiment, therefore, essentially the fluctuation of the communication time period in the packet communication network is absorbed by the equalization delay (EqD) which is set for the PON section.

The fluctuating factors of the EqD in the PON section are, for example, the new addition of the ONU 210, a new path configuration (the addition of a path ID), and the transmission characteristic change of the optical fiber (such as the expansion or contraction of the optical fiber attributed to a temperature fluctuation). After the transmission network has been configured, the characteristic change of the optical fiber becomes the principal fluctuating factor except a topological change, but a transmission time fluctuation due to this cause is very slight.

On the other hand, regarding a packet network part which accommodates the optical access network, the load of the devices constituting the transmission network changes every moment. Since each individual packet relaying device accommodates a plurality of paths, the load sometimes concentrates at part of the network, depending upon a traffic situation. The possibility is not negligible that either or both of the working and protection paths will be influenced by such a load, and that the transmission time period in the protection section will fluctuate. At least in an ordinary mode, it should be considered that the transmission time period will fluctuate more frequently than a transmission characteristic in the PON section, and that the width of the fluctuation will be larger.

It is therefore necessary to regularly monitor the communication time periods taken from the OLT 210-W and the OLT 210-P to the OAM adaptive NE 200-Z, and to occasionally feed them back to the OLTs 210-W and 210-P. The monitoring needs to have a frequency which is higher than or at least equal to the frequency of delay time difference notifications from the OAM adaptive NE 200-Z to the OLTs 210-W and 210-P. The OLTs 210 perform communications with the ONU 220, in accordance with a fundamental cycle which is used for the signal transfer of the PON section. The fundamental cycle is 125 microseconds in, for example, the GPON, and it is required for the check of a bandwidth request from the ONU 220, the discovery and startup processes of the ONU 220, etc. Usually, the DBA is performed in units of integral times the fundamental cycle. In packaging, it is convenient to check the communication time periods from the OLT 210-W and the OLT 210-P to the OAM adaptive NE 200-Z by utilizing the units.

Figure 13:
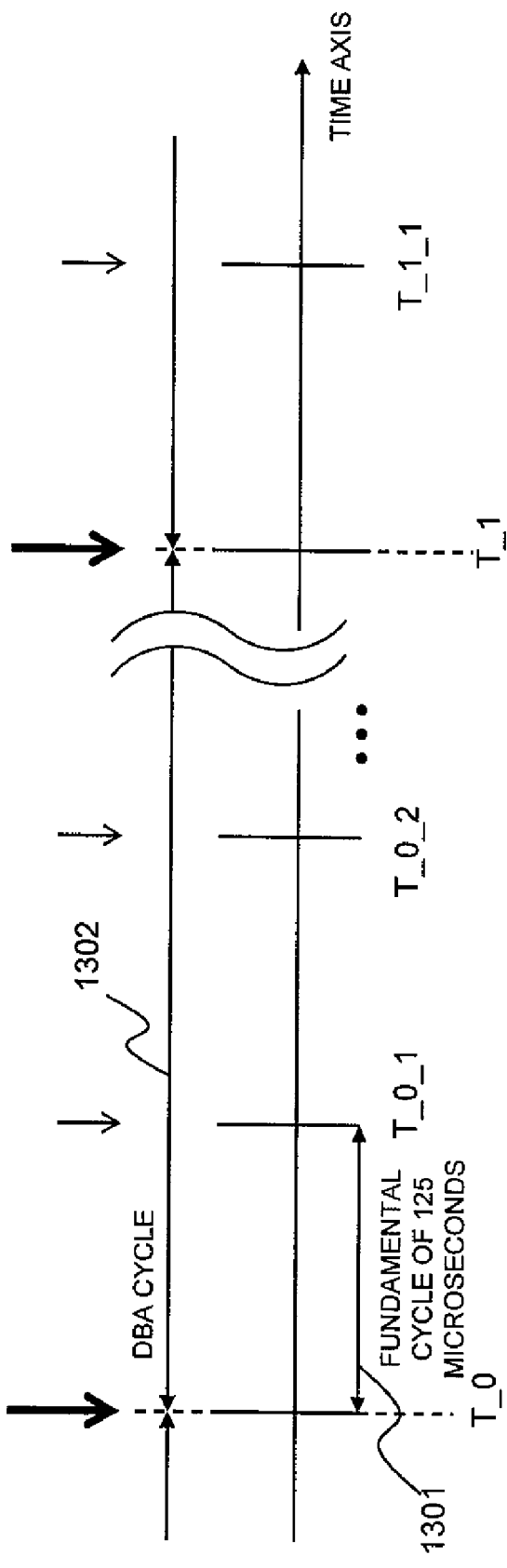
FIG. 13 is a diagram of a setting example of a cycle for checking communication time periods from the OLT 210-W and an OLT 210-P to the OAM adaptive NE 200-Z.

FIG. 13 shows a diagram of a setting example of a cycle for checking the communication time periods from the OLT 210-W and the OLT 210-P to the OAM adaptive NE 200-Z.

The figure shows a situation where a DBA cycle 1302 is set with reference to a 125-microsecond cycle 1301 which is an example of the fundamental cycle of the GPON control. Here, in the DBA cycle 1302 which begins at a time T_0, bandwidth assignments in the next DBA cycle beginning at a time T_1 are computed in the OLTs 210. In one cycle ending at the time T_0, therefore, requests from the ONUs 220 for determining the bandwidths to be assigned in the cycle beginning at T_1 have been collected.

The cycle for checking the communication time periods from the OLT 210-W and OLT 210-P to the OAM adaptive NE 200-Z may well be executed at the same timing as the DBA cycle, and communication situations may well be checked in detail at the same timing as the fundamental cycle. The figure shows an example in which the communication situation in the path of the packet network side is checked at the same timing as the boundary of the DBA cycle.

Regarding the timing for checking the communication time periods from the OLT 210-W and OLT 210-P to the OAM adaptive NE 200-Z, it is also effective to check the communication time period in the path of the packet network side, in a case where the communication situation of the PON section has fluctuated. As the fluctuation in the communication state of the PON section, the fluctuation of a communication timing from the ONU 220 to the OLT 210 has the highest possibility of occurrence. Since the transmission timing of an uplink frame from the ONU 220 is monitored in order to perform the time division multiplexing of an uplink signal as the fundamental operation of the PON, the fluctuation is considered as a kind of alarm which can be grasped earliest on the path in the OLT.

In the description of Embodiment 1 up to FIG. 12, there has been stated the method in which the communication time period difference between the OAM adaptive NEs is reflected on the EqD information of the PON section. On the other hand, the communication time period difference between the OLTs and the OAM adaptive NE as is obtained by the additional function is used for monitoring the change of a communication characteristic (concretely, a delay time) in the packet communication network. More specifically, in a case where the round-trip communication time period between the OLT and the OAM adaptive NE has changed in excess of a certain threshold value, it is judged that the readjustment of the EqD information is necessary. In the sense of the state monitoring, accordingly, either the (round-trip time period)/2 or the round-trip time period itself may be used.

In the example of FIG. 13, it is supposed that the frequency at which the communication time period between the OLT and the OAM adaptive NE is checked is higher than in the first embodiment employing the CCM frame. There might be a reverse case. Since, however, the access lines (PON) are usually in a bandwidth sharing aspect, they accompany the required condition of reducing a bandwidth consumption quantity to the utmost. In that sense, the point stated above is considered as a possible supposition. On this occasion, the adjustment magnitude obtained can be used for finely adjusting the EqD information obtained in Embodiment 1.

Figure 15:
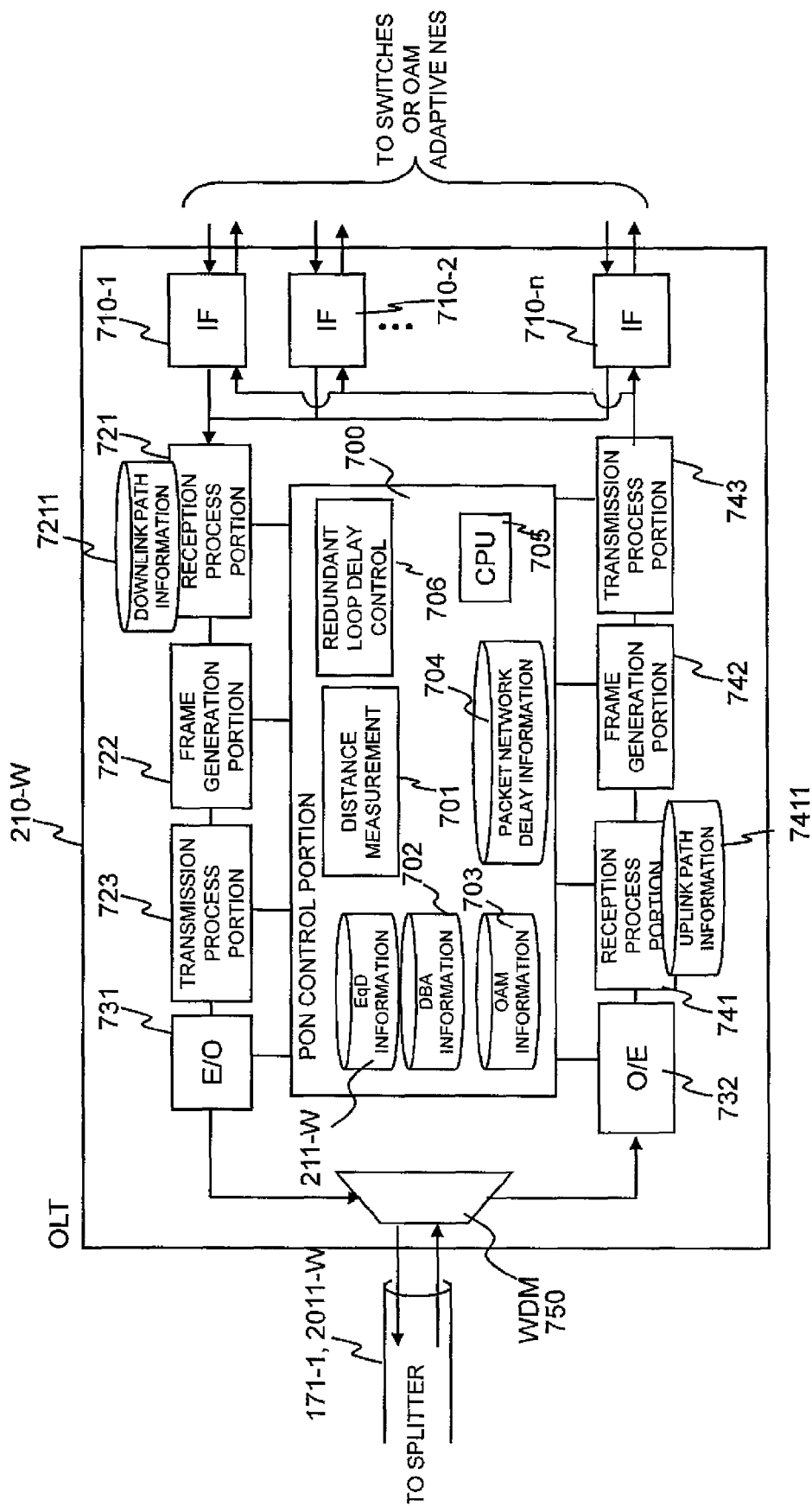
FIG. 15 is a device configurational diagram of the OLT furnished with an additional function.

FIG. 15 shows a device configurational diagram of the OLT furnished with the additional function.

The OLT 210 includes a packet network delay information database 704 for managing the communication time period with the OAM adaptive NE 200-Z, in addition to the EqD information database 211-W for controlling the communication timing from the ONU 220. The remaining configuration is the same as in Embodiment 1 in FIG. 4.

Figure 14:
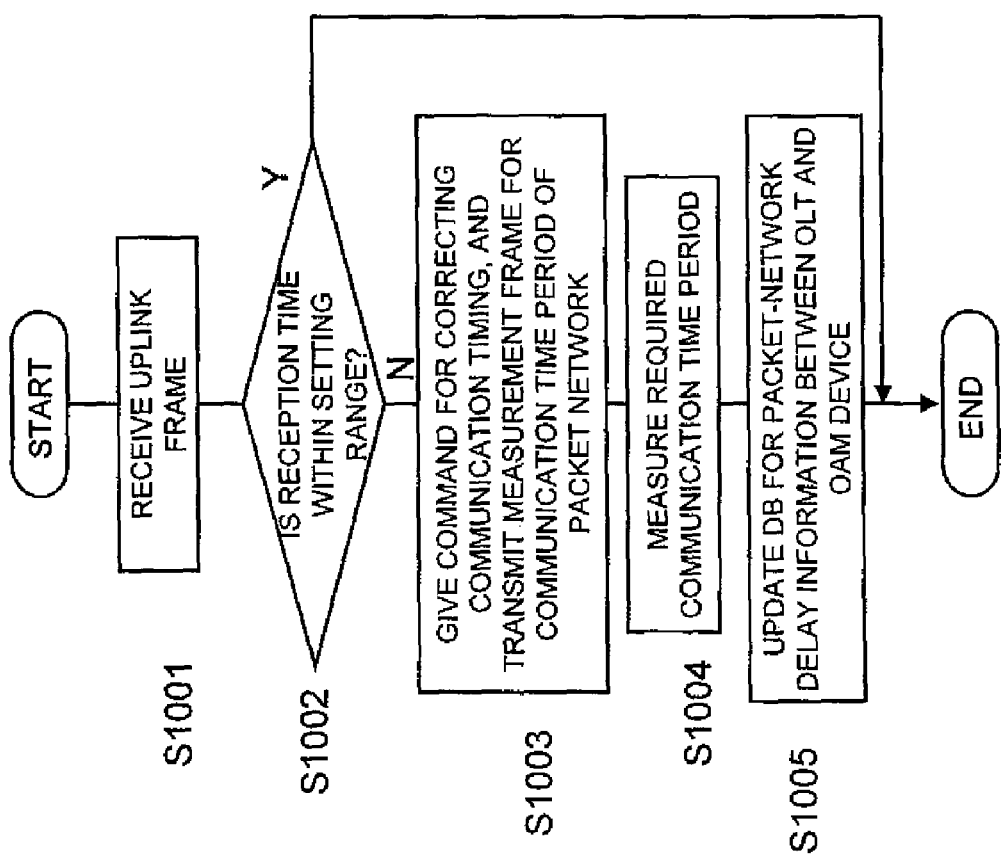
FIG. 14 is a flow chart showing a path state monitoring procedure interlocked with a PON state change.

FIG. 14 is a flow chart showing a path state monitoring procedure interlocked with a PON state change.

When the OLT 210 (for example, PON control portion 700) receives an uplink frame (S1001), it decides whether or not a time at which the frame has been received lies within the setting range of times supposed by itself (S1002). When the OLT 210 has found out that a difference from an estimated time is at least a predetermined value (that the reception time lies outside the setting range), it gives a command for correcting a transmission timing, to the ONU to which the transmission of the pertinent frame has been granted (S1003). As a method on this occasion, a revision magnitude may be directly indicated to the ONU, or the ranging of the ONU may well be performed again. The latter is employed in a case where the error is large and where it cannot be coped with by the relative revision. This is a prescribed operation.

Further, in a case where an error of predetermined magnitude or above has been confirmed and where the reception time has been decided to lie outside the setting range, the OLT 210 gives a revision command to the ONU and also investigates a communication state in the direction of the packet network. For this purpose, the OLT 210 transmits a delay measurement frame generated for investigating the packet network side, to the OAM adaptive NE 200-Z (S1003), and it observes a response to the transmitted frame. Thus, the OLT 210 measures a round-trip communication time period and obtains the round-trip communication time period between the OLT 210 and the OAM adaptive NE (S1004). The OLT 210 computes an adjustment magnitude on the basis of the measured round-trip communication time period, and it retains the adjustment magnitude in the packet-network delay information database 704 within the OLT 210 (S1005). The OLT 210 repeats the processing of the steps S1002 to S1004 in a fixed cycle. Incidentally, the OLT 210 may well send the delay measurement frame of the step S1003 in a predetermined cycle, instead of the steps S1001 and S1002.

The configuration of this database is the same as in (B) in FIG. 5, and the path IDs and the delay information items corresponding to the respective path IDs are retained in association. Although the identification number of the OAM adaptive NE 200-Z connected to the OLT 210 may well be employed as in (A) in FIG. 5, the OAM adaptive NE to which the OLT 210 is connected is fundamentally different in accordance with the path ID. It is therefore desirable to use the path ID as a search key. In a case where the identification number of the OAM adaptive NE 200-Z is used as a key, a method in which the delay information items are associated with the path IDs as in (C) in FIG. 5 is also effective.

Figure 16:
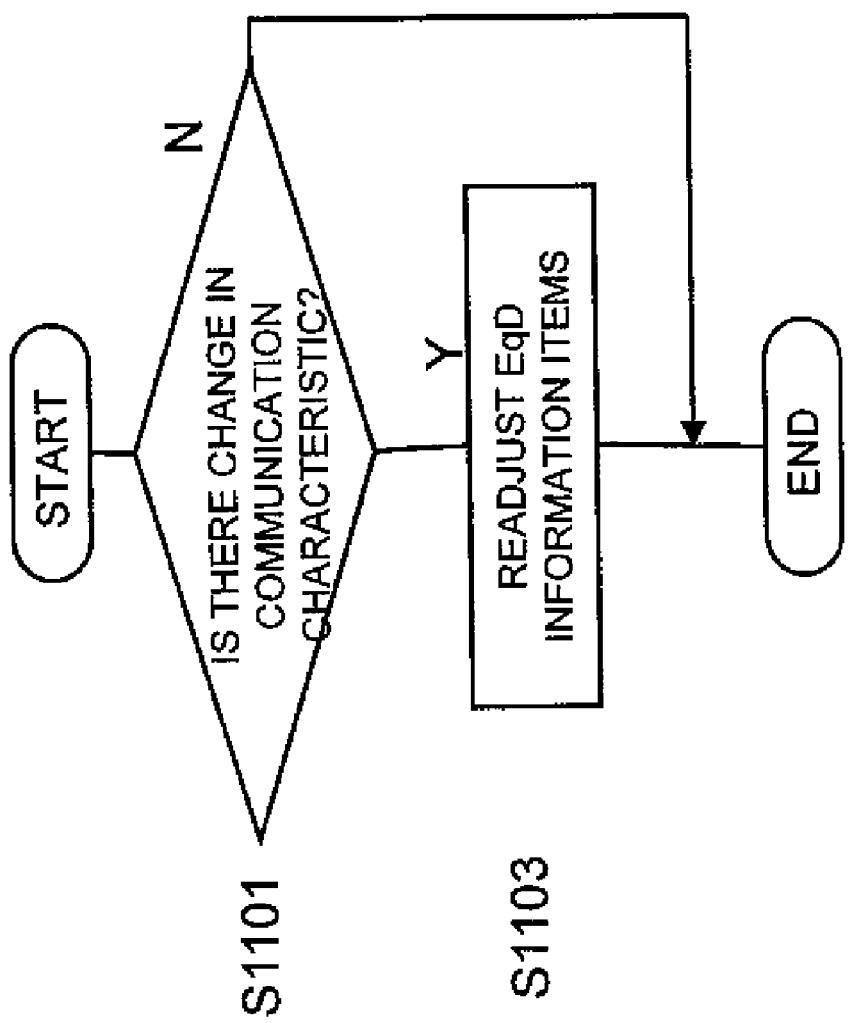
FIG. 16 is a flow chart concerning the additional process of the OLT.

FIG. 16 shows a flow chart concerning the additional process of the OLT.

In, for example, "Operation after System setting" shown in FIG. 12, the OLT 210 executes the ensuing additional process in each of the frame processes S506-P and S506-W (by appropriate process portions, for example, the PON control portion 700 and transmission process portion 743), thereby to incarnate an add-on function. More specifically, the OLT 210 obtains an adjustment magnitude with reference to the packet-network delay information database 704. In a case where a communication characteristic has changed, such as a case where the fluctuation of the round-trip communication time period has exceeded a predetermined threshold value (S1101), EqD information items are readjusted by the individual OLTs 210 so as to suppress (absorb) a fluctuation magnitude (S1103). Here, the communications between the OLTs are not necessary. By way of example, the OLT 210 executes a process for retarding or advancing (increasing or decreasing) ½ of the round-trip communication time period, in accordance with a case where the round-trip communication time period has shortened or lengthened. Besides, the OLT performs the first embodiment in accordance with another cycle, so as to reset the EqD information items for the ONUs.

Incidentally, the OLT 210 may well calculate the adjustment magnitude of a required delivery time period on the basis of a required communication time period, with reference to the required communication time period recorded in the packet-network delay information database 704, further adjust a correction magnitude so as to suppress the fluctuation magnitude of the communication time period, on the basis of the calculated adjustment magnitude, and indicate an EqD information denoting a wait time period for adjusting the required delivery time period, to one or more subordinate ONUs 220, in accordance with the adjusted correction magnitude.

As described above, this embodiment incarnates the time adjustment and arbitration by using the difference of the required communication time period over the whole protection section which includes the PON section, and the communication time period between the OLT which manages the communications in the PON section, and the OAM adaptive NE 200-Z which corresponds to one end of the connected protection section.

The difference of the former is notified from the OAM adaptive NE 200-Z to the OLT 210, while the management of the communication state (required time period) between the OLT 210 and the OAM adaptive NE 200-Z as corresponds to the latter is performed on the OLT side.

By the way, in the fundamental configuration of this embodiment, any absolute value retained in the packet-network delay information database is not used for the communication time period adjustment of the protection section. A relative communication time period difference in the whole protection section as is notified from the OAM adaptive NE 200-Z is reflected on the PON section to the last. The packet-network delay information database has as its purpose, a fine adjustment after the communication time period difference between both the loops has been once adjusted.

Besides, the OAM adaptive NE 200-Z includes the delay database in which the communication time period difference between both the loops is recorded. The arrival times of both the loops, and the difference of the arrival times of both the loops are recorded in the delay database.

The same frame format as in FIG. 8 can be applied to a frame which is employed for the packet-network delay measurement. The frame employs "OpCode" (defined anew) which indicates that this frame is for measuring the round-trip communication time period.

The present invention is applicable, not only to the PON, but also to any of various communication systems as includes a plurality of sorts of networks.

What is claimed is:
1. A communication system comprising:
one subscriber accommodation network which includes a first subscriber accommodation device capable of connecting one or more subscriber devices in a time division multiplexing scheme, and a second subscriber accommodation device capable of connecting one or more other subscriber devices in the time division multiplexing scheme, or a plurality of subscriber accommodation networks which include the first or second subscriber accommodation devices individually;
a first communication network which includes a plurality of subscriber devices, and a first communication device connectable with the plurality of subscriber devices; and
a second communication network which includes the first and second subscriber accommodation devices, and a second communication device that is capable of connecting the first and second subscriber accommodation devices and that has a function of selecting either of subscriber devices connected to the first subscriber accommodation device or subscriber devices connected to the second subscriber accommodation device or subscriber devices connected to the first communication device, to-be-utilized,
in which the first communication device and the second communication device are connected by a plurality of communication paths through the first communication network, the one or the plurality of subscriber accommodation networks, and the second communication network,
wherein,
in adjusting a required time period of information delivery between the first communication device and the second communication device, the first communication device which serves as a transmission side sends communication time period measuring frames for measuring the required delivery time periods, to the plurality of communication paths, to a first and second subscriber devices,
the first and second subscriber devices receive the communication time period measuring frames, and transmit first and second delay measurement frames based on the communication time period measuring frames, respectively, to the first and second subscriber accommodation devices,
the first and second subscriber accommodation devices receive the first and second delay measurement frames, and transfer the first and second delay measurement frames to the second communication device, respectively,
the second communication device which serves as a reception side for the plurality of communication paths receives the first and second delay measurement frames, and records a first and second required delivery time periods through the plurality of communication paths, in a delay database, respectively,
the second communication device calculates correction magnitudes of the required delivery time periods in the plurality of communication paths, with reference to the first and second required delivery time periods,
the second communication device notifies the correction magnitudes to the first or second subscriber accommodation device which has a function of controlling the required delivery time period in the subscriber accommodation network, and the first or second subscriber accommodation device indicates delay information denoting a wait time period for adjusting the required delivery time period, to at least one of the plurality of subordinate subscriber devices, in accordance with the correction magnitude, and a subordinate subscriber device adjusts transfer timings in accordance with the delay information, by a function of controlling the required delivery time periods provided by the subordinate subscriber devices, so that the required delivery time periods between the first communication device and the second communication device are adjusted so as to equalize in the plurality of communication paths which connect the first communication device and the second communication device.

2. A communication system as defined in claim 1, wherein the second communication device notifies the correction magnitude which indicates a wait time period for adjusting the required delivery time period, to the subscriber accommodation device which has a function of controlling the required delivery time period in the subscriber accommodation network, the subscriber accommodation device obtains the delay information from the correction magnitude, stores the obtained delay information, and notifies the delay information to the subscriber device, and the subscriber device adjusts a logical communication distance on the basis of the delay information by using a logic distance control function or a ranging function with respect to the subscriber device in the subscriber accommodation device, to absorb a difference of the required delivery time period as to each communication path.

3. A communication system as defined in claim 1, wherein, when the first communication device sends the communication time period measuring frames for measuring the required delivery time periods between the first communication device and the second communication device, to the plurality of communication paths, the first communication device includes path identification information indicating the communication paths through which the communication time period measuring frames pass, or identification information capable of identifying the frames, and sending timing identification information or sending times indicating times at which the delay measurement frames are sent, into the communication time period measuring frames, and sends the communication time period measuring frames.

4. A communication system as defined in claim 1, wherein, for adjusting a required delivery time period between the second communication device and the first subscriber accommodation device, or between the second communication device and the second subscriber accommodation device, the first or second subscriber accommodation device sends a third delay measurement frame for measuring a required communication time period with respect to the second communication device, the first or second subscriber accommodation device measures the required communication time period taken until a frame responding from the second communication device is received, and records an adjustment magnitude in a packet network delay information database.

5. A communication system as defined in claim 4, wherein:
the first or second subscriber accommodation device calculates the adjustment magnitude of the required delivery time period on the basis of the required communication time period, with reference to the required communication time period recorded in the packet network delay information database; and the first or second subscriber accommodation device adjusts a time at which the frame is sent to the second communication device so as to suppress a fluctuation magnitude of a communication time period on the basis of the adjustment magnitude.

6. A communication system as defined in claim 4, wherein:
the first or second subscriber accommodation device calculates the adjustment magnitude of the required delivery time period on the basis of the required communication time period, with reference to the required communication time period recorded in the packet network delay information database;

the first or second subscriber accommodation device adjusts the correction magnitude so as to suppress a fluctuation magnitude of a communication time period on the basis of the adjustment magnitude; and the first or second subscriber accommodation device indicates delay information indicating a wait time for adjusting the required delivery time period, to at least one of the plurality of subordinate subscriber devices in accordance with the correction magnitude.

7. A communication system as defined in claim 4, wherein:
the first or second subscriber accommodation device sends the third delay measurement frame when the reception time of an uplink frame falls outside predetermined range, or every predetermined cycle.

8. A communication system comprising:
one subscriber accommodation network which includes a first subscriber accommodation device capable of connecting one or more subscriber devices in a time division multiplexing scheme, and a second subscriber accommodation device capable of connecting one or more other subscriber devices in the time division multiplexing scheme, or a plurality of subscriber accommodation networks which include the first or second subscriber accommodation devices individually;

a first communication network which includes a plurality of subscriber devices, and a first communication device connectable with the plurality of subscriber devices; and a second communication network which includes the first and second subscriber accommodation devices, and a second communication device that is capable of connecting the first and second subscriber accommodation devices and that has a function of selecting either of subscriber devices connected to the first subscriber accommodation device or subscriber devices connected to the second subscriber accommodation device or subscriber devices connected to the first communication device, to-be-utilized, in which the first communication device and the second communication device are connected by a plurality of communication paths through the first communication network, the one or the plurality of subscriber accommodation networks, and the second communication network, wherein,
when both paths of a working system and a protection system have been established, the first communication device simultaneously forwards communication time period measuring frames which includes path identification information and sending timing identification information, to both the paths;

a first subscriber device which has received the communication time period measuring frame sends a first delay measurement frame to an uplink communication path, in accordance with an assignment of a bandwidth by the first subscriber accommodation device;

a second subscriber device which has received the communication time period measuring frame sends a second delay measurement frame to an uplink communication path, in accordance with an assignment of a bandwidth by the second subscriber accommodation device;

the first subscriber accommodation device which has received the first delay measurement frame from the first subscriber device converts the first delay measurement frame from a format for transferring this frame by the subscriber accommodation network, into a packet format for transferring this frame by the second communication network toward the second communication device, and the first subscriber accommodation device transfers the resulting first delay measurement frame to the second communication device;

the second subscriber accommodation device which has received the second delay measurement frame from the second subscriber device converts the second delay measurement frame from a format for transferring this frame by the subscriber accommodation network, into a packet format for transferring this frame by the second communication network toward the second communication device, and the second subscriber accommodation device transfers the resulting second delay measurement frame to the second communication device;

the second communication device receives the first delay measurement frame from the first subscriber accommodation device, and records a reception time in a delay database, in association with path identification information and transmission timing identification information which are contained in the first delay measurement frame, while the second communication device receives the second delay measurement frame from the second subscriber accommodation device, and records a reception time in the delay database, in association with path identification information and transmission timing identification information which are contained in the second delay measurement frame;

the second communication device calculates an arrival time difference between the delay measurement frames from both the paths, on the basis of the reception times of the delay measurement frames having the same transmission timing identification information from both the paths, and records the arrival time difference in the delay database, in association with the path identification information and the transmission timing identification information; and when the delay measurement frames having the same transmission timing identification information have already been received from a plurality of paths, with reference to the delay database, the second communication device compares the reception times of the delay measurement frames from both the paths, and transmits a delay feedback frame for a revision request containing a correction magnitude based on the arrival time difference, to the first subscriber accommodation device or the second subscriber accommodation device on a side of earlier reception time.

9. A communication system as defined in claim 8, wherein: the first or second subscriber accommodation device which has received the delay feedback frame from the second communication device revises delay information in accordance with a content of the correction magnitude contained in the delay feedback frame, and notifies the revised delay information to the subordinate first or second subscriber device.

10. A communication system as defined in claim 9, wherein:
when the first or second subscriber device receives a transmission command by a downlink frame from the first or second subscriber accommodation device and, after the first or second subscriber device receives the downlink frame, the first or second subscriber device waits for a time period complying with the delay information since a timing of the transmission command, and the first or second subscriber device transmits a signal toward the first subscriber accommodation device.

11. A communication apparatus in a communication system, the communication system comprising:
one subscriber accommodation network which includes a first subscriber accommodation device capable of connecting one or more subscriber devices in a time division multiplexing scheme, and a second subscriber accommodation device capable of connecting one or more other subscriber devices in the time division multiplexing scheme, or a plurality of subscriber accommodation networks which include the first or second subscriber accommodation devices individually;
a first communication network which includes a plurality of subscriber devices, and a first communication device connectable with the plurality of subscriber devices; and
a second communication network which includes the first and second subscriber accommodation devices, and a second communication device that is capable of connecting the first and second subscriber accommodation devices and that has a function of selecting either of subscriber devices connected to the first subscriber accommodation device or subscriber devices connected to the second subscriber accommodation device or subscriber devices connected to the first communication device, to-be-utilized,
in which the first communication device and the second communication device are connected by a plurality of communication paths through the first communication network, the one or the plurality of subscriber accommodation networks, and the second communication network,
wherein, by the communication apparatus,
a first delay measurement frame which contains path identification information and sending timing identification information which has been transmitted from an other communication device is received from a path which passes through a first subscriber device and the first subscriber accommodation device, and a reception time thereof is recorded in a delay database, in association with path identification information and transmission timing identification information which are contained in the first delay measurement frame;
a second delay measurement frame which contains path identification information and sending timing identification information which has been transmitted simultaneously with the first delay measurement frame from the other communication device is received from a path which passes through a second subscriber device and the second subscriber accommodation device, and a reception time thereof is recorded in the delay database, in association with path identification information and transmission timing identification information which are contained in the second delay measurement frame;
an arrival time difference between the delay measurement frames from both the paths is calculated on the basis of the reception times of the delay measurement frames having the same transmission timing identification information items, from both the paths, and the arrival time difference is recorded in the delay database, in association with the path identification information and the transmission timing identification information; and when the delay measurement frames having the same transmission timing identification information items have already been received from a plurality of paths, with reference to the delay database, the reception times of the delay measurement frames from both the paths are compared, and a delay feedback frame for a revision request which contains a correction magnitude based on an arrival time difference is transmitted to the first subscriber accommodation device or the second subscriber accommodation device on a side of earlier reception time.

* * * * *